United States Patent
Clive

(10) Patent No.: US 11,442,166 B2
(45) Date of Patent: Sep. 13, 2022

(54) METHODS AND SYSTEMS FOR USE IN REMOTE SENSING

(71) Applicant: SgurrEnergy Limited, Glasgow (GB)

(72) Inventor: Peter James Macdonald Clive, Glasgow (GB)

(73) Assignee: SGURRENERGY LIMITED, Glasgow (GB)

( * ) Notice: Subject to any disclaimer, the term of this patent is extended or adjusted under 35 U.S.C. 154(b) by 728 days.

(21) Appl. No.: 16/309,774

(22) PCT Filed: Jun. 12, 2017

(86) PCT No.: PCT/GB2017/051704
§ 371 (c)(1),
(2) Date: Dec. 13, 2018

(87) PCT Pub. No.: WO2017/216531
PCT Pub. Date: Dec. 21, 2017

(65) Prior Publication Data
US 2019/0310365 A1    Oct. 10, 2019

(30) Foreign Application Priority Data

Jun. 13, 2016   (GB) ..................... 1610259

(51) Int. Cl.
*G01S 15/58*   (2006.01)
*G01S 17/88*   (2006.01)
(Continued)

(52) U.S. Cl.
CPC .......... *G01S 15/582* (2013.01); *G01S 7/4817* (2013.01); *G01S 15/58* (2013.01); *G01S 15/885* (2013.01);
(Continued)

(58) Field of Classification Search
CPC ...... G01S 15/582; G01S 7/4817; G01S 17/88; G01S 17/95; G01S 15/58; G01S 15/885;
(Continued)

(56) References Cited

U.S. PATENT DOCUMENTS 8,373,589 B2 *  2/2013  McLaughlin ............ H01Q 3/08
                                                    342/26 R
9,182,485 B1   11/2015  Andrews
(Continued)

FOREIGN PATENT DOCUMENTS

CN       104569981       4/2015
DE       102012019663    4/2014
(Continued)

OTHER PUBLICATIONS

International Preliminary Report on Patentability for application No. PCT/GB2017/051704, dated Dec. 18, 2018.
(Continued)

*Primary Examiner* — Daniel L Murphy
(74) *Attorney, Agent, or Firm* — Carlson, Gaskey & Olds, P.C.

(57) ABSTRACT

A measurement configuration of a remote sensing device for use in implementing a remote sensing measurement campaign is improved. One method includes adjusting a scan geometry configuration of the remote sensing device during the measurement campaign based on measurement data acquired in a previous scan geometry configuration. In another method, the remote sensing device is configured in a scan geometry configuration having a plurality of scan geometries, and following acquisition of a measurement data set by the remote sensing device at a first time interval, one of the scan geometries indicative of an improved or optimal scan geometry at the first time interval is selected. The remote sensing device forms part of a remote sensing
(Continued)

system and includes an optical source emitting a probe as a light beam along different lines of sight. The remote sensing device includes or is operatively associated with a receiver for detecting the reflected probe.

19 Claims, 16 Drawing Sheets

(51) Int. Cl.
*G01S 7/481* (2006.01)
*G06F 17/11* (2006.01)
*G01S 17/95* (2006.01)
*G01S 15/88* (2006.01)
*G01S 17/58* (2006.01)

(52) U.S. Cl.
CPC .............. *G01S 17/58* (2013.01); *G01S 17/88* (2013.01); *G01S 17/95* (2013.01); *G06F 17/11* (2013.01); *Y02A 90/10* (2018.01)

(58) Field of Classification Search
CPC ......... G01S 17/58; G06F 17/11; Y02A 90/10; Y02A 90/19
USPC .......................................................... 367/90
See application file for complete search history.

(56) References Cited

U.S. PATENT DOCUMENTS

| | | |
|---|---|---|
| 2011/0234453 A1 | 9/2011 | Mizutani |
| 2012/0128488 A1 | 5/2012 | Kristoffersen |
| 2013/0099497 A1 | 4/2013 | Bowyer |
| 2015/0093243 A1 | 4/2015 | Canal Vila |
| 2016/0047895 A1 | 2/2016 | Dussan |

FOREIGN PATENT DOCUMENTS

| | | |
|---|---|---|
| GB | 2532585 | 5/2016 |
| JP | H11271443 | 10/1999 |
| JP | 2004309367 | 11/2004 |
| JP | 2005351853 | 12/2005 |
| JP | 2006177853 | 7/2006 |

OTHER PUBLICATIONS

International Search report for Application No. PCT/GB2017/051704 dated Aug. 23, 2017.
British Search Report for Application No. GB1610259 dated Nov. 18, 2016.
Written Opinion of the International Searching Authority for Application No. PCT/GB2017/051704.

\* cited by examiner

METHODS AND SYSTEMS FOR USE IN REMOTE SENSING

REFERENCED TO RELATED APPLICATIONS

This application is a United States National Phase application of PCT Application No. PCT/GB2017/051704 filed on Jun. 12, 2017, which claims priority to United Kingdom Application No. 1610259.2 filed on Jun. 13, 2016.

FIELD

This invention relates to methods and systems for use in remote sensing. More particularly, but not exclusively, embodiments of the invention relate to methods and systems for use in remote sensing applications associated with an energy capture device.

BACKGROUND

Remote sensing involves the acquisition of data relating to an object or region from a distance and can be used to acquire measurements of fluid properties from a fluid under investigation. These fluid properties may, for example but not exclusively, include wind conditions or other atmospheric and/or environmental parameters within a given measurement volume. Remote sensing devices (RSDs) used to carry out remote sensing operations operate by emitting a signal ("a probe") which interacts with, and is modified by, the fluid under investigation. The modified probe is then detected by the RSD, or by another RSD or other receiver, and analysed to determine one or more property of the fluid in the region in which the interaction occurred ("the probe volume"). The desired property or properties of the fluid under investigation may then be determined from the way the probe was modified.

RSDs are used in a number of different applications and environments and take a number of different forms.

Although RSDs are used effectively in many applications, there are challenges and drawbacks with conventional systems and techniques. For example, inaccuracies in the fluid data acquired by the RSD can have a significant detrimental effect on the effectiveness of the measurement campaign and, where for example the acquired data relates to fluid properties associated with energy capture devices, can result in inefficiency of the energy capture devices and inaccuracy in estimates of their performance and energy yield.

SUMMARY

According to a first aspect, there is provided a method for use in remote sensing, the method comprising receiving measurement data acquired previously during a remote sensing measurement campaign, determining from the received measurement data an adjustment in a measurement configuration of the remote sensing device, wherein said adjustment to the measurement configuration of the remote sensing device comprises a change in a scan geometry configuration of the remote sensing device, and providing an output indicative of the change to the scan geometry configuration of the remote sensing device for use in adjusting the remote sensing device during said measurement campaign.

The method may comprise a method for improving the operation of a remote sensing device for use in implementing a remote sensing measurement campaign.

The method may comprise a method for implementing a remote sensing measurement campaign.

The method may comprise adjusting the measurement configuration of the remote sensing device by changing, during said measurement campaign, the scan geometry configuration of the remote sensing device based on the output.

In particular embodiments, the measurement data acquired previously comprises measurement data acquired in a previous scan geometry configuration of the remote sensing device.

Alternatively, or additionally, the measurement data acquired previously may comprise measurement data acquired during the measurement campaign by another remote sensing device, or other sensing or measurement device.

Beneficially, embodiments of the invention permit an optimal or at least improved remote sensing measurement campaign to be implemented under changing conditions by actively adjusting the measurement configuration of the remote sensing device during the measurement campaign. This is effected by adapting the scan geometry configuration of the remote sensing device during the measurement campaign based on measurement data acquired earlier during the same measurement campaign; in contrast to conventional RSDs which offer only a single scan geometry configuration during a measurement campaign—typically the default setting of the particular remote sensing device or one which is based on the initial objectives of the measurement campaign and projections of prevailing conditions made prior to commencing the measurement campaign. Embodiments of the present invention may adapt the configuration of the remote sensing device, and in particular the configuration of its scan geometry, during the measurement campaign to match the circumstances and conditions in which the measurements are acquired, which may vary significantly and repeatedly over time. Embodiments of the present invention thereby mitigate or eliminate inaccuracies which may otherwise arise in conventional systems and techniques due to measurement biases resulting from the, often significant, periods of time when measurements obtained are not fit for purpose or are relevant only for part of a given measurement campaign.

Particular embodiments of the present invention may facilitate the improved acquisition of measurement data, for example, but not exclusively, relating to wind conditions in the lower region of the atmosphere known as the Atmospheric Boundary Layer (ABL) which is of particular interest for ground based and low altitude wind energy applications and/or relating to water or tidal conditions which are of particular interest for tidal energy applications.

In use, the remote sensing device may be provided in a first scan geometry configuration and the method may comprise adjusting the remote sensing device from the first scan geometry configuration to a second scan geometry configuration based on the measurement data acquired previously during the measurement campaign.

The method may comprise determining from the measurement data acquired previously during the measurement campaign a required change in the scan geometry configuration of the remote sensing device. The method may comprise communicating the required change in scan geometry configuration to the remote sensing device.

In some embodiments, the method may comprise rewriting the scan geometry configuration of the remote sensing device. Adjusting the measurement configuration of the remote sensing device may comprise rewriting the scan geometry configuration of the remote sensing device based on the output.

In other embodiments, the method may comprise choosing a selected scan geometry configuration for the remote sensing device from a plurality of pre-determined scan geometry configurations for the remote sensing device. Adjusting the measurement configuration of the remote sensing device may comprise choosing a selected scan geometry configuration for the remote sensing device from a plurality of pre-determined scan geometry configurations for the remote sensing device based on the output.

In particular embodiments, the method may comprise adjusting the remote sensing device from the first scan geometry configuration to the second scan geometry configuration based on a previous data set acquired during the measurement campaign by the remote sensing device. For example, the method may comprise adjusting the remote sensing device from the first scan geometry configuration to the second scan geometry configuration based on a first measurement data set acquired during the measurement campaign by operation of the remote sensing device in the first scan geometry configuration. The method may comprise operating the remote sensing device according to the first scan geometry configuration to acquire the first measurement data set.

The method may comprise determining from the acquired first data set a measurement of interest.

Determining the change in the scan geometry configuration may comprise determining a measurement of interest from the received measurement data acquired previously during the measurement campaign and determining from the measurement of interest a scan geometry configuration of the remote sensing device which is indicative of an improved or optimal scan geometry configuration of the remote sensing for said measurement of interest.

Adjusting the measurement configuration of the remote sensing device may comprise changing the scan geometry configuration of the remote sensing device according to the improved or optimal scan geometry configuration of the remote sensing device for said measurement of interest during the measurement campaign.

The method may comprise outputting the measurement of interest.

The method may comprise operating the remote sensing device according to the second scan geometry configuration to acquire a second measurement data set.

The method may comprise determining, from the acquired second data set, a measurement of interest. The method may comprise outputting the measurement of interest determined from the acquired second data set.

The active adjustment of the scan geometry configuration may be repeated to acquire a series of data sets, each of which is obtained under circumstances optimized in terms of scan geometry and device configuration.

Accordingly, the conditions relative to which the scan geometry configuration is to be improved or optimized may be assessed continuously or at intervals during the measurement campaign and the scan geometry configuration adjusted while the measurements are being taken.

Adjusting the scan geometry configuration of the remote sensing device may be carried out after each data acquisition.

Adjusting the scan geometry configuration of the remote sensing device may be carried out after a selected number of data acquisitions.

Adjusting the scan geometry configuration of the remote sensing device may be carried out when the data acquired in the first or previous scan geometry configuration indicates a change in scan geometry configuration is required to maintain an optimal device configuration on the basis of the value of a parameter related to wind conditions and derived from the data exceeding a selected threshold.

The adjustment of the scan geometry configuration may take a number of forms.

In some embodiments, the method may comprise a direction tracking operation.

The direction tracking operation may comprise a direction tracking arc scan operation.

The direction tracking arc scan operation may comprise at least one of: configuring the remote sensing device in a first scan geometry configuration, the first scan geometry configuration comprising a first subset of beam orientations or lines of sight (LoS) from the available beam orientations or lines of sight (LoS) of the remote sensing device, determining a measurement of interest from a first measurement data set acquired previously during the measurement campaign, said first measurement data set comprising measurement data acquired by the remote sensing device from said first subset of beam orientations or lines of sights (LoS) in the first scan geometry configuration or comprising measurement data acquired by another remote sensing device or other sensing or measurement device during said measurement campaign, determining from the measurement of interest obtained from the first measurement data set a scan geometry configuration of the remote sensing device which is indicative of an improved or optimal scan geometry configuration of the remote sensing device for said measurement of interest, and providing an output indicative of the required change to the scan geometry configuration of the remote sensing device.

The method may comprise the step of operating the remote sensing device according to the first scan geometry configuration to acquire a first data set.

The method may comprise at least one of: adjusting the measurement configuration of the remote sensing device by changing the scan geometry configuration of the remote sensing device to a second scan geometry configuration based on the output, the second scan geometry configuration comprising a second subset of beam orientations or lines of sight (LoS) from the available beam orientations or lines of sight (LoS) of the remote sensing device, and operating the remote sensing device according to the second scan geometry configuration to acquire a second measurement data set.

This process may be continued, with each subsequent scan geometry being optimized with reference to the data set acquired using the preceding scan geometry in a similar way.

Beneficially, a direction tracking arc scan operation facilitates optimization or at least improvement in the scan geometry configuration of the remote sensing device since the most appropriate subset of beam orientations or lines of sight (LoS) is implemented for a given instance of data acquisition during the measurement campaign, this based on active monitoring of the results from previous recent iterations.

The direction tracking may comprise a direction tracking compound scan geometry operation.

The direction tracking arc scan operation may comprise at least one of: configuring the remote sensing device in a first scan geometry configuration, the first scan geometry configuration comprising a compound scan geometry including a first simple scan geometry element and a second simple scan geometry element, determining a measurement of interest from a first measurement data set acquired previously during the measurement campaign, said first measurement data set comprising measurement data acquired by the remote sensing device from said compound scan geometry or comprising measurement data acquired by another remote sensing device or other sensing or measurement device during said measurement campaign, determining from the measurement of interest obtained from the first measurement data set a scan geometry configuration of the remote sensing device which is indicative of an improved or optimal scan geometry configuration of the remote sensing device for said measurement of interest, and providing an output indicative of the required change to the scan geometry configuration of the remote sensing device.

The method may comprise the step of operating the remote sensing device according to the first scan geometry configuration to acquire the first measurement data set.

The method may comprise at least one of: adjusting the scan geometry configuration of the remote sensing device to a second scan geometry configuration by aligning the orientation of the first simple scan geometry element with the orientation of the second simple scan geometry element, and operating the remote sensing device according to the second scan geometry configuration to acquire a second measurement data set.

The first simple scan geometry element may comprise a range height indicator (RHI) element for surveying a vertical surface for detailed characterization of wind shear phenomena.

The second simple scan geometry element may comprise an arc scan element, for determination of wind direction.

This process of measurement and adjustment may be repeated for the duration of the measurement campaign.

In this context, the orientation of the RHI vertical surface comprises the azimuth angle of the beam swept in elevation angle across the surface to implement the necessary lines of sight.

The method may comprise or further comprise a volume tracking operation.

The volume tracking operation may comprise at least one of: configuring the remote sensing device in a first scan geometry configuration, the first scan geometry configuration comprising information relating to the direction to a volume of interest relative to the remote sensing device, determining a measurement of interest from a first measurement data set acquired previously during the measurement campaign, said first measurement data set comprising measurement data acquired by the remote sensing device from the first measurement data set or comprising measurement data acquired by another remote sensing device or other sensing or measurement device during said measurement campaign, determining from the measurement of interest obtained from the first measurement data set a scan geometry configuration of the remote sensing device which is indicative of an improved or optimal scan geometry configuration of the remote sensing device for said measurement of interest, providing an output indicative of the required change to the scan geometry configuration of the remote sensing device.

The method may comprise the step of operating the remote sensing device according to the first scan geometry configuration to acquire a first measurement data set, the first measurement data set including information relating to the direction to the volume of interest relative to the remote sensing device.

The method may comprise at least one of: adjusting the scan geometry configuration of the remote sensing device from the first scan geometry configuration to a second scan geometry configuration based on the data indicating the direction to the volume of interest relative to the remote sensing device, and operating the remote sensing device according to the second scan geometry configuration to acquire a second measurement data set.

This process of alternating measurement and adjustment of scan geometry to maintain an optimal device configuration may be repeated for the duration of the measurement campaign.

Beneficially, a volume tracking operation facilitates improvement or optimization of the scan geometry configuration of the remote sensing device in applications where, for example, the remote sensing device is mounted on a platform that is not fixed with respect to the reference frame relative to which the wind velocity vector components are expressed and in which the volume of interest is fixed. For example, a remote sensing device, such as a Lidar device, may be situated on the nacelle of a wind turbine, which rotates about a vertical axis in the reference frame in which wind velocity vector components are expressed and the volume of interest is fixed as the axis of the wind turbine is yawed to follow the wind as it changes direction. The lines of sight of the Lidar device are fixed in the frame of reference in which the remote sensing device and the platform on which it is mounted are fixed. However, this frame of reference itself rotates in the frame of reference in which wind velocity vector components are expressed and the location of a volume of potential interest where these velocity components are to be determined is fixed. In some applications, the remote sensing device is required to measure wind conditions in another volume which is fixed relative to another reference frame. For example, the Lidar device installed on the nacelle of one turbine may be required to measure conditions in front of, or behind, the rotor of another wind turbine. The direction to this volume in the reference frame of the device will change depending upon the orientation of the platform on which the Lidar is mounted with respect to the location of the volume of interest. The lines of sight are fixed in the frame of reference in which the RSD and the platform on which it is mounted are fixed. However, this frame of reference itself rotates in the frame of reference in which the volume of interest is fixed. In this case, active optimization can be achieved if signals indicating the direction to the volume of interest relative to the RSD are processed and the scan geometry updated accordingly to re-orientate the lines of sight towards the volume of interest.

In some embodiments, the method may comprise or further comprise a convergent scan geometry operation.

The convergent scan geometry operation may comprise at least one of: configuring the remote sensing device in a first scan geometry configuration, the first scan geometry configuration comprising a probe volume configured to coincide with a probe volume of at least one other remote sensing device, determining a measurement of interest from a first measurement data set acquired previously during the measurement campaign, said first measurement data set comprising measurement data acquired by the remote sensing device from the first measurement data set or comprising measurement data acquired by another remote sensing device or other sensing or measurement device during said measurement campaign, determining from the measurement of interest obtained from the first measurement data set a scan geometry configuration of the remote sensing device which is indicative of an improved or optimal scan geometry configuration of the remote sensing device for said measurement of interest, and providing an output indicative of the required change to the scan geometry configuration of the remote sensing device.

The method may comprise the step of operating the remote sensing device according to the first scan geometry configuration to acquire the first measurement data set.

The method may comprise at least one of: adjusting the scan geometry configuration of the remote sensing device based on the first measurement data set to maintain coincidence between the probe volume of the remote sensing device and the probe volume of the at least one other remote sensing device, and operating the remote sensing device according to the second scan geometry configuration to acquire a second measurement data set.

Beneficially, a convergent scan geometry operation permits the scan geometry configuration of the remote sensing device to be updated to track the location of interest and ensure the probe volume common to multiple lines of sight at which the convergent scan geometry measurements are acquired coincides with the location of the volume of interest.

Other features of the first aspect are described below, although it will be understood that these features may also be found in any other aspect.

The scan geometry configuration of the remote sensing device may determine the properties of a probe signal emitted by the remote sensing device.

The scan geometry configuration may comprise positional information.

The scan geometry configuration may comprise information relating to the location of a probe volume within the measurement volume.

The scan geometry configuration may comprise information relating to the distribution of probe volumes within the measurement volume.

The scan geometry configuration may comprise information relating to the orientation of a probe volume relative to the direction or line of sight along which the probe signal is emitted.

The scan geometry configuration may comprise information relating to the orientation of a probe volume relative to the direction along which the probe signal is detected.

The information relating to the orientation of the probe volume may comprise azimuth angle and/or elevation angle information.

The scan geometry configuration may comprise timing information.

The scan geometry configuration may comprise information relating to the time at which the probe is emitted.

The scan geometry configuration may comprise information relating to the time the probe interacts with the fluid under investigation.

The scan geometry configuration may comprise information relating to the time the probe is detected.

In use, the remote sensing device may be operated according to the scan geometry configuration to acquire the measurement data from the fluid under investigation, from which the desired fluid property or properties can be determined.

The scan geometry configuration may be selected from a look-up table of scan geometries.

The scan geometry configuration may be calculated using an algorithm.

The scan geometry configuration may be adjusted according to, or take account of, a number of inputs.

For example, the scan geometry configuration may be adjusted to take account of a changing frame of reference.

The remote sensing device may be installed in a location which changes its position or orientation relative to the intended measurement volume. The scan geometry configuration may be adjusted to compensate for these changes and maintain an unchanged measurement volume.

The scan geometry may comprise a simple scan geometry.

A simple scan geometry can be defined as a collection of probe volumes in which measurements acquired such that the orientations of the lines of sight along which they are acquired vary in only a single degree of freedom. For example, the lines of sight may differ only in azimuth angle, or only in elevation angle.

In embodiments where the scan geometry comprises a simple scan geometry, the simple scan geometry may comprise one of: Range Height Indicators (RHIs), Position Plan Indicators (PPIs), Velocity Azimuth Display (VAD), and Arc scans.

Range Height Indicators (RHIs) entail lines of sight that differ in elevation angle. Position Plan Indicators (PPIs) entail lines of sight that differ in azimuth angle.

Velocity Azimuth Display (VAD) and Arc scans may be considered special cases of PPIs for specific purposes. VAD entails variation in beam orientation over 360 degrees of azimuth whereas Arc scans (also termed sector scans) entail variation in beam azimuth over less than 360 degrees. As a consequence, the measurement volume is not constrained to the region above the device. By way of comparison, VAD and arc scans are typically sparse with a small number of probe volumes used to measure wind speed and direction, whereas RHI and PPI scans are typically dense with many more lines of sight and probe volumes used to visualise and map fluid flow over a large surface area.

The scan geometry may comprise a complex scan geometry.

A complex scan geometry is less constrained than a simple scan geometry. For example, the lines of sight may differ in more than one degree of freedom, such as both azimuth angle and elevation angle.

The scan geometry may comprise a compound scan geometry.

This is a scan geometry from which subsets of probe volumes can be selected. Each of these subsets also constitutes a valid scan geometry for a specified purpose. A compound scan geometry may comprise a combination of multiple elements which are themselves scan geometries. Each element may contain a unique set of probe volumes, or individual robe volumes may be included in more than one element.

The scan geometry may comprise a single probe volume.

The scan geometry may comprise a plurality of probe volumes.

Operating the remote sensing device may comprise emitting a probe signal ("the emitted probe signal").

The emitted probe signal may comprise a laser signal.

The emitted probe signal may comprise a sound signal.

The emitted probe signal may comprise an acoustic signal.

In some embodiments, the emitted probe signal may comprise a continuous signal. For example, the remote sensing device may be configured to emit the emitted probe signal in the form of a continuous wave or continuous beam.

In other embodiments, the emitted probe signal may comprise a non-continuous signal. For example, the emitted probe signal may comprise a series of pulses.

The method may comprise detecting a return probe signal, that is the modified probe signal emitted by the remote sensing device or another remote sensing device.

The method may comprise providing one or more output value from the data acquired which is indicative of a fluid property of the fluid under investigation. The one or more output value may comprise or may be determined from the measurement of interest.

The method may comprise providing output values from the data acquired by each of the simple scan geometry elements which can be extracted from compound scan geometries.

The fluid data may comprise fluid velocity data.

In some embodiments, the fluid data may comprise wind velocity data.

In some embodiments, the fluid data may comprise water velocity data.

The fluid data may comprise fluid speed data.

The fluid data may comprise wind speed data.

The fluid data may comprise water speed data.

The fluid data may comprise fluid direction data.

In some embodiments, the fluid data may comprise wind direction data.

In some embodiments, the fluid data may comprise water direction data.

The fluid data may comprise fluid turbulence data.

In some embodiments, the fluid data may comprise wind turbulence data.

In some embodiments, the fluid data may comprise water turbulence data.

In particular embodiments, the method may determine the output value by measuring the back-scatter of the emitted probe signal, for example the back scatter of the emitted probe signal reflected—in the case of air—by natural aerosols carried by the wind, such as dust, water droplets, pollution, pollen, salt crystals or the like or—in the case of water—particles in the water column. The emissions are back-scattered and detected and the Doppler shift imposed on the frequency of the probe signal by the motion of the aerosol particles is analysed to infer characteristics of the fluid motion. As the Doppler shift is proportional to the component of the fluid velocity vector aligned with the line of sight (LoS) along which the probe signal is directed, that is, the radial velocity, the fluid velocity vector components can be inferred from observations of radial velocities along various lines of sight. The velocity vectors (for example wind velocity vectors or water velocity vectors) witnessed in each probe volume can be deduced from the observations, for example if each probe volume used in the calculation witnesses the same velocity vector, which is the case under conditions of uniform flow.

The fluid data may comprise data relating to the composition of the fluid.

For example, the strength of the detected return probe signal can indicate the concentration of the particles at the point where the interaction occurred. Polarization effects are also sometimes observed.

The output value may be communicated to a control system and/or to a remote location.

The method may comprise adjusting the position, for example the yaw angle, of the energy capture device.

According to a second aspect, there is provided a method for use in remote sensing, the method comprising: adjusting a measurement configuration of a remote sensing device for use in implementing a remote sensing measurement campaign during said remote sensing measurement campaign, wherein said adjustment to the measurement configuration of said remote sensing device comprises changing a scan geometry configuration of the remote sensing device based on measurement data acquired previously during the measurement campaign.

Features described above with respect to the first aspect may be implemented in isolation or in combination in the second aspect or any other aspect.

According to a third aspect, there is provided a system for use in remote sensing, the system comprising: a controller configured to receive measurement data acquired previously during a remote sensing device measurement campaign, the controller configured to determine from the received measurement data an adjustment in a measurement configuration of the remote sensing device, wherein said adjustment to the measurement configuration of the remote sensing device comprises a change in a scan geometry configuration of the remote sensing device, wherein the controller is configured to provide an output indicative of the change to the scan geometry configuration of the remote sensing device for use in adjusting the remote sensing device during said measurement campaign.

The system may be configured to adjust the measurement configuration of the remote sensing device during the measurement campaign based on the output.

The controller may be configured to adjust the scan geometry configuration of the remote sensing device based on measurement data acquired previously during the measurement campaign by the remote sensing device.

The system may be configured to adjust the measurement configuration of the remote sensing device based on measurement data acquired previously during the measurement campaign by the remote sensing device.

The system may be configured to adjust the measurement configuration of the remote sensing device based on measurement data acquired previously during the remote sensing measurement campaign by another remote sensing device or other sensing or measurement device during said measurement campaign.

The system may be configured to adjust the measurement configuration of the remote sensing device by rewriting the scan geometry configuration of the remote sensing device.

The controller may be configured to adjust the scan geometry configuration of the remote sensing device by rewriting the scan geometry configuration of the remote sensing device.

In other embodiments, the system may be configured to adjust the measurement configuration of the remote sensing device by selecting a scan geometry configuration for the remote sensing device from a plurality of pre-determined scan geometry configurations for the remote sensing device.

The controller may be configured to adjust the scan geometry configuration of the remote sensing device by selecting a scan geometry configuration for the remote sensing device from a plurality of pre-determined scan geometry configurations for the remote sensing device.

The system may comprise a remote sensing device.

The remote sensing device may comprise a Lidar sensing device. Beneficially, a Lidar sensing device permits measurement of complex fluid flows across wide areas. One example of an RSD is a Lidar (light detection and ranging) device operable to emit a probe in the form of a laser signal. In use, the Lidar probe may be backscattered in the atmosphere, the modification to the Lidar probe resulting from the backscattering being measured when the laser signal is detected by the Lidar device. Properties of the probe volume (in this case the volume of the atmosphere in which the interaction and backscattering occurred) can be determined from the way the probe was modified. For example, the frequency of the laser emissions may be Doppler shifted by the motion of material which has caused the backscattering being advected in the atmosphere relative to the location of the Lidar device. By measuring the Doppler shift, the motion can then be inferred.

In other embodiments, the remote sensing device may comprise a Sodar sensing arrangement. Another example of an RSD is a Sodar (sonic detection and ranging) device operable to emit a probe in the form of a sound signal. In use, the Sodar probe may be reflected by temperature inhomogeneities in the air, the atmospheric features with which the sonic signal interacts through reflection being advected by the motion of the fluid, in this case wind.

In other embodiments, the remote sensing device may comprise an Acoustic Doppler Current Profiler (ADCP). Another example of an RSD is an Acoustic Doppler Current Profiler (ADCP), which as the name suggests is typically used in underwater applications to determine properties of water currents. In use, the ADCP device emits a sonic probe which interacts with and is modified by the current, the interaction for example imposing a Doppler shift on the frequency of the reflected sound signal which is proportional to the component of the fluid velocity vector along the direction in which the probe signal was emitted and reflected. The ambient fluid velocity vector can then be inferred by witnessing its components detected in multiple directions along which multiple instances of this interaction are observed.

The system may comprise one or more energy capture devices. The remote sensing device may be operatively associated with the one or more energy capture devices.

The energy capture device may comprise a wind energy capture device. For example, the energy capture device may comprise a wind turbine.

The energy capture device may comprise a tidal energy capture device. For example, the energy capture device may comprise a tidal turbine.

The remote sensing device may be located on the energy capture device. Alternatively, or additionally, the remote sensing device may be disposed at a remote location. The remote sensing device may be disposed on the ground. The remote sensing device may be disposed on a platform, such as an offshore platform or the like. The remote sensing device may be disposed on another energy capture device.

The remote sensing device may be configured to acquire data relating to environmental conditions.

The remote sensing device may be configured to acquire data relating to atmospheric conditions.

In particular embodiments, the remote sensing device may be configured to acquire data relating to wind conditions.

In other embodiments, the remote sensing device may be configured to acquire data relating to tidal conditions.

The remote sensing device may be configured to emit a probe signal ("the emitted probe signal").

The emitted probe signal may comprise a laser signal.

The emitted probe signal may comprise a sound signal.

The emitted probe signal may comprise an acoustic signal.

In some embodiments, the emitted probe signal may comprise a continuous signal. For example, the remote sensing device may be configured to emit the emitted probe signal in the form of a continuous wave or continuous beam.

In addition to variations in the nature of the emitted probe signal (for example, laser signal, sonic signal, etc.), the emitted probe may also take a number of different forms. For example, in some instances RSDs emit a probe in the form of a continuous signal or beam, this being known as continuous emission or Continuous Wave (CW). In use, continuous emission or CW devices typically impose a variation in the sensitivity of the device with distance in order to select a specific range at which the measurements are acquired, in order to provide the required discrimination of the distance from the RSD to the probe volume where the interaction with the fluid under investigation occurs. In other instances, RSDs emit a probe in the form of a series of pulses, for example, a series of laser pulses or a series of sonic pulses. In use, the distance to the probe volume is determined by observing the time of flight (ToF) of the pulses from the moment of emission, through the moment at which the interaction occurs, to the moment of detection by the RSD.

In other embodiments, the emitted probe signal may comprise a non-continuous signal. For example, the emitted probe signal may comprise a series of pulses.

The remote sensing device may be configured to impose a variation in the sensitivity of the remote sensing device with distance in order to select a specific distance range for the emitted probe signal.

The remote sensing device may be configured to detect the modified probe signal emitted by the remote sensing device or another remote sensing device ("the return signal").

The system may comprise a control system.

The control system may be configured to adjust the position, for example the yaw angle, of the energy capture device.

The system may comprise a communication arrangement.

The communication arrangement may be of any suitable form and construction.

The communication arrangement may be configured to transmit the output value to the control system.

Alternatively, or additionally, the communication arrangement may be configured to transmit the output value to a remote location.

According to a fourth aspect, there is provided a method for use in remote sensing, the method comprising: receiving measurement data acquired by a remote sensing device in a first scan geometry configuration at a first time interval, the first scan geometry configuration comprising a plurality of scan geometries, determining, from the received measurement data, one of the plurality of scan geometries which is indicative of an improved or optimal scan geometry at the first time interval, and providing an output indicative of a measurement of interest for the improved or optimal scan geometry at the first time interval.

The method may comprise a method for improving the operation of a remote sensing device for use in implementing a remote sensing measurement campaign.

The method may comprise a method for implementing a remote sensing measurement campaign.

The method may comprise multiple passes through the acquired data, a first pass for determining the prevailing conditions relevant for the selection of the optimal scan geometry for a given iteration of the compound scan geometry and a second pass for deriving a measurement of interest from the acquired data.

The plurality of scan geometries of the first scan geometry configuration may comprise a plurality of distinct and valid individual scan geometries which together form a compound scan geometry.

The method may comprise at least one of: providing a remote sensing device and configuring the remote sensing device in the first scan geometry configuration, operating the remote sensing device in the first scan geometry configuration to acquire the first measurement data set for each of the scan geometries at the first time interval, determining, from the acquired data set, a measurement of interest at the first time interval from the selected optimal scan geometry, operating the remote sensing device to acquire a second measurement data set for each of the plurality of scan geometries at a second time interval, and determining, from the acquired measurement data set, one of the plurality of scan geometries which is indicative of an improved or optimal scan geometry at the second time interval.

The method may comprise multiple passes through the acquired second measurement data set, a first pass determining the prevailing conditions relevant for the selection of the improved or optimal scan geometry and a second pass deriving a measurement of interest from the acquired second measurement data set.

Beneficially, embodiments of this aspect permit an optimal or at least improved remote sensing measurement campaign to be implemented under changing conditions by passively adjusting the scan geometry configuration of the remote sensing device during the measurement campaign by selecting the optimal scan geometry from the plurality of scan geometries available of which the first scan geometry is comprised, during processing of data acquired over multiple time steps, in contrast to conventional RSDs which offer only a single scan geometry configuration—typically the default setting of the particular remote sensing device—or one geometry configuration which is configured prior to commencing a measurement campaign and which is based on the initial objectives of the measurement campaign, such that an optimal scan geometry cannot be selected with reference to variation of wind conditions during the measurement campaign.

The method may comprise operating the remote sensing device in the first scan geometry configuration to acquire the first measurement data set for each of the scan geometries at the first time interval.

The method may comprise determining, from the acquired data set, a measurement of interest at the first time interval from the selected optimal scan geometry.

The method may comprise operating the remote sensing device to acquire a second measurement data set for each of the plurality of scan geometries at a second time interval.

The method may comprise determining, from the acquired measurement data set, one of the plurality of scan geometries which is indicative of an improved or optimal scan geometry at the second time interval.

The method may comprise determining, from the acquired data set, a measurement of interest at the second time interval from the selected scan geometry.

This process may be iterated over a succession of subsequent time steps.

The first scan geometry configuration may comprise a compound scan geometry. In particular embodiments, the first scan geometry configuration comprises a fixed compound scan geometry.

The first scan geometry configuration may comprise a plurality of probe volumes. Different combinations of probe volumes may then comprise the plurality of scan geometries comprising the first scan geometry.

The improved or optimal scan geometry may comprise a single probe volume. However, in particular embodiments the improved or optimal scan geometry comprises a plurality of probe volumes.

Once circumstances of the measurement at a given time during the campaign are determined, during subsequent data analysis the appropriate subsets of probe volumes are selected as the optimal scan geometry at any given time from the available probe volumes in the compound scan geometry.

The subset of probe volumes may be selected from a look up table of scan geometry elements included in the compound scan geometry that was implemented with reference to the prevailing conditions (for example, prevailing wind conditions or prevailing water conditions) at any given time.

The subset of probe volumes may be determined using an algorithm that relates the observed conditions (for example, observed wind conditions or observed water conditions) to the selection of probe volumes that would constitute an optimal subset under those circumstances.

As outlined above, the method may comprise multiple passes through the acquired data.

A first pass may determine the prevailing conditions relevant for the selection of the optimal scan geometry from the compound scan geometry for a given iteration of the compound scan geometry.

A second pass may derive the measurements of interest from the acquired data using the selected scan geometry comprising the subset of probe volumes identified as optimal.

The first scan geometry configuration may comprise a Velocity Azimuth Display scan (VAD scan) operation.

In some embodiments, the first scan geometry configuration may comprise a Velocity Azimuth Display scan (VAD scan) operation in which the number of probe volumes is greater than the minimum necessary to implement a VAD scan.

The VAD scan may then comprise a plurality of arc scan elements. The VAD scan may thus define an over-determined VAD. Whereas a minimum number of beam orientations are required to determine wind velocity when using a conventional VAD scan, by implementing a plurality of arc scan elements it is possible to acquire data along more lines of sight, from which an optimal arc scan element or subset of elements, and thus an optimal scan geometry configuration, can be determined.

The reasons why an individual arc scan may be considered optimal include (but are not limited to) the following. Wind measurements are required in the upwind direction only. This direction relative to the device changes as the wind direction changes. The wind turbine obstructs the flow downwind of it. This causes a perturbation which results in conditions which may violate the assumptions on which the inference of wind parameters from the line of sight data is based. At any given time, an individual arc scan may be selected from the available arc scan elements, such that this element is not influenced by flow perturbation arising from obstructions. At any given time, the upwind arc scan element is available for selection. This arc scan element is not influenced by perturbations that violate the assumptions on which the inference of wind parameters from line of sight data is based.

The scan geometry configuration of the remote sensing device may comprise scan geometry information comprising at least one of: positional information, information relating to the location of a probe volume within a measurement volume, information relating to the distribution of probe volumes within a measurement volume, information relating to the orientation of a probe volume relative to the direction or line of sight along which a probe signal is emitted, information relating to the orientation of a probe volume relative to the direction along which the probe signal is detected, information relating to the azimuth angle of a probe volume relative to the direction along which the probe signal is detected, and information relating to the elevation angle of a probe volume.

The scan geometry configuration may comprise scan geometry information comprising at least one of: timing information, information relating to the time at which the probe is emitted, information relating to the time the probe interacts with the fluid under investigation, information relating to the time the probe is detected.

Other features of the fourth aspect are described below, although it will be understood that these features may also be found in any other aspect.

The scan geometry configuration of the remote sensing device determines the properties of a probe signal emitted by the remote sensing device.

The scan geometry configuration may comprise positional information.

The scan geometry configuration may comprise information relating to the location of a probe volume within the measurement volume.

The scan geometry configuration may comprise information relating to the distribution of probe volumes within the measurement volume.

The scan geometry configuration may comprise information relating to the orientation of a probe volume relative to the direction or line of sight along which the probe signal is emitted.

The scan geometry configuration may comprise information relating to the orientation of a probe volume relative to the direction along which the probe signal is detected.

The information relating to the orientation of the probe volume may comprise azimuth angle and/or elevation angle information.

The scan geometry configuration may comprise timing information.

The scan geometry configuration may comprise information relating to the time at which the probe is emitted.

The scan geometry configuration may comprise information relating to the time the probe interacts with the fluid under investigation.

The scan geometry configuration may comprise information relating to the time the probe is detected.

In use, the remote sensing device may be operated according to the scan geometry configuration to acquire the measurement data from the fluid under investigation, from which the desired fluid property or properties can be determined.

The scan geometry configuration may be selected from a look-up table of scan geometries.

The scan geometry configuration may be calculated using an algorithm.

The scan geometry configuration may be adjusted according to, or to take account of, a number of inputs.

For example, the scan geometry configuration may be adjusted to take account of a changing frame of reference. The remote sensing device may be installed in a location which changes its position or orientation relative to the intended measurement volume. The scan geometry configuration may be adjusted to compensate for these changes and maintain an unchanged measurement volume.

The scan geometry may comprise a simple scan geometry.

A simple scan geometry can be defined as a collection of probe volumes in which measurements acquired such that the orientations of the lines of sight along which they are acquired vary in only a single degree of freedom. For example, the lines of sight may differ only in azimuth angle, or only in elevation angle.

In embodiments where the scan geometry comprises a simple scan geometry, the simple scan geometry may comprise at least one of: Range Height Indicators (RHIs), Position Plan Indicators (PPIs), Velocity Azimuth Display (VAD), and Arc scans.

Range Height Indicators (RHIs) entail lines of sight that differ in elevation angle. Position Plan Indicators (PPIs) entail lines of sight that differ in azimuth angle.

Velocity Azimuth Display (VAD) and Arc scans may be considered special cases of PPIs for specific purposes. VAD entails variation in beam orientation over 360 degrees of azimuth whereas Arc scans (also termed sector scans) entail variation in beam azimuth over less than 360 degrees. As a consequence, the measurement volume associated with the arc scan is not constrained to the region above the device. By way of comparison, VAD and arc scans are typically sparse with a small number of probe volumes used to measure wind speed and direction, whereas RHI and PPI scans are typically dense with many more lines of sight and probe volumes used to visualise and map fluid flow over a large surface area.

The scan geometry may comprise a complex scan geometry.

A complex scan geometry is less constrained than a simple scan geometry. For example, the lines of sight may differ in more than one degree of freedom, such as both azimuth angle and elevation angle.

The scan geometry may comprise a compound scan geometry.

This is a scan geometry from which subsets of probe volumes can be selected. Each of these subsets also constitute a valid scan geometry for a specified purpose. A compound scan geometry may comprise a combination of multiple elements which are themselves scan geometries. Each element may contain a unique set of probe volumes, or individual probe volumes may be included in more than one element.

The scan geometry may comprise a single probe volume.

The scan geometry may comprise a plurality of probe volumes.

Operating the remote sensing device may comprise emitting a probe signal ("the emitted probe signal").

The emitted probe signal may comprise a laser signal.

The emitted probe signal may comprise a sound signal.

The emitted probe signal may comprise an acoustic signal.

In some embodiments, the emitted probe signal may comprise a continuous signal. For example, the remote sensing device may be configured to emit the emitted probe signal in the form of a continuous wave or continuous beam.

In other embodiments, the emitted probe signal may comprise a non-continuous signal. For example, the emitted probe signal may comprise a series of pulses.

The method may comprise detecting a return probe signal, that is the modified probe signal emitted by the remote sensing device or another remote sensing device.

The method may comprise providing one or more output value from the data acquired which is indicative of a fluid property of the fluid under investigation. The one or more output value may comprise or may be determined from the measurement of interest.

The method may comprise providing output values from the data acquired by each of the simple scan geometry elements which can be extracted from compound scan geometries.

The fluid data may comprise fluid velocity data.

In some embodiments, the fluid data may comprise wind velocity data.

In some embodiments, the fluid data may comprise water velocity data.

The fluid data may comprise fluid speed data.

The fluid data may comprise wind speed data.

The fluid data may comprise water speed data.

The fluid data may comprise fluid direction data.

In some embodiments, the fluid data may comprise wind direction data.

In some embodiments, the fluid data may comprise water direction data.

The fluid data may comprise fluid turbulence data.

In some embodiments, the fluid data may comprise wind turbulence data.

In some embodiments, the fluid data may comprise water turbulence data.

In particular embodiments, the method may determine the output value by measuring the back-scatter of the emitted probe signal, for example the back scatter of the emitted probe signal reflected—in the case of air—by natural aerosols carried by the wind, such as dust, water droplets, pollution, pollen, salt crystals or the like or—in the case of water—particles in the water column. The emissions are back-scattered and detected and the Doppler shift imposed on the frequency of the probe signal by the motion of the aerosol particles is analysed to infer characteristics of the fluid motion. As the Doppler shift is proportional to the component of the fluid velocity vector aligned with the line of sight (LoS) along which the probe signal is directed, that is, the radial velocity, the fluid velocity vector components can be inferred from observations of radial velocities along various lines of sight. The velocity vectors (for example wind velocity vectors or water velocity vectors) witnessed in each probe volume can be deduced from the observations, for example, if each probe volume used in the calculation witnesses the same velocity vector, which is the case under conditions of uniform flow.

The fluid data may comprise data relating to the composition of the fluid.

For example, the strength of the detected return probe signal can indicate the concentration of the particles at the point where the interaction occurred. Polarization effects are also sometimes observed.

The output value may be communicated to a control system and/or to a remote location.

The method may comprise adjusting the position, for example, the yaw angle, of the energy capture device.

According to a fifth aspect, there is provided a system for use in remote sensing comprising: a controller configured to determine, from a measurement data set acquired by the remote sensing device in a first scan geometry configuration at a first time interval, one of a plurality of scan geometries which is indicative of an improved or optimal scan geometry at the first time interval.

The system may comprise a remote sensing device operable to implement a remote sensing measurement campaign.

The plurality of scan geometries of the first scan geometry configuration may comprise a combination of distinct and valid individual scan geometries.

The remote sensing device may be operable in the first scan geometry configuration to acquire the first measurement data set for each of the scan geometries at the first time interval.

The controller may be configured to determine, from the acquired data set, a measurement of interest at the first time interval from the selected optimal scan geometry.

The remote sensing device may be operable to acquire a second measurement data set for each of the plurality of scan geometries at a second time interval.

The controller may be configured to determine, from the acquired measurement data set, one of the plurality of scan geometries which is indicative of an improved or optimal scan geometry at the second time interval.

The remote sensing device may comprise a Lidar sensing device. Beneficially, a Lidar sensing device permits measurement of complex fluid flows across wide areas. One example of an RSD is a Lidar (light detection and ranging) device operable to emit a probe in the form of a laser signal. In use, the Lidar probe may be backscattered in the atmosphere, the modification to the Lidar probe resulting from the backscattering being measured when the laser signal is detected by the Lidar device. Properties of the probe volume (in this case the volume of the atmosphere in which the interaction and backscattering occurred) can be determined from the way the probe was modified. For example, the frequency of the laser emissions may be Doppler shifted by the motion of material which has caused the backscattering being advected in the atmosphere relative to the location of the Lidar device. By measuring the Doppler shift, the motion can then be inferred.

In other embodiments, the remote sensing device may comprise a Sodar sensing arrangement. Another example of an RSD is a Sodar (sound detection and ranging) device operable to emit a probe in the form of an acoustic signal. In use, the Sodar probe may be reflected by temperature inhomogeneities in the air, the atmospheric features with which the acoustic signal interacts through reflection being advected by the motion of the fluid, in this case wind.

In other embodiments, the remote sensing device may comprise an Acoustic Doppler Current Profiler (ADCP). Another example of an RSD is an Acoustic Doppler Current Profiler (ADCP), which as the name suggests is typically used in underwater applications to determine properties of water currents. In use, the ADCP device emits a sonic probe which interacts and is modified by the current, the interaction for example imposing a Doppler shift on the frequency of the reflected sound signal which is proportional to the component of the fluid velocity vector along the direction in which the probe signal was emitted and reflected. The ambient fluid velocity vector can then be inferred by witnessing its components detected in multiple directions along which multiple instances of this interaction are observed.

The system may comprise one or more energy capture devices. The remote sensing device may be operatively associated with the one or more energy capture devices.

The energy capture device may comprise a wind energy capture device. For example, the energy capture device may comprise a wind turbine.

The energy capture device may comprise a tidal energy capture device. For example, the energy capture device may comprise a tidal turbine.

The remote sensing device may be located on the energy capture device. Alternatively, or additionally, the remote sensing device may be disposed at a remote location. The remote sensing device may be disposed on the ground. The remote sensing device may be disposed on a platform, such as an offshore platform or the like. The remote sensing device may be disposed on another energy capture device.

The remote sensing device may be configured to acquire data relating to environmental conditions.

The remote sensing device may be configured to acquire data relating to atmospheric conditions.

In particular embodiments, the remote sensing device may be configured to acquire data relating to wind conditions.

In other embodiments, the remote sensing device may be configured to acquire data relating to tidal conditions.

The remote sensing device may be configured to emit a probe signal ("the emitted probe signal").

The emitted probe signal may comprise a laser signal.

The emitted probe signal may comprise a sound signal.

The emitted probe signal may comprise an acoustic signal.

In some embodiments, the emitted probe signal may comprise a continuous signal. For example, the remote sensing device may be configured to emit the emitted probe signal in the form of a continuous wave or continuous beam.

In addition to variations in the nature of the emitted probe signal (for example laser signal, sonic signal, etc), the emitted probe may also take a number of different forms. For example, in some instances RSDs emit a probe in the form of a continuous signal or beam, this being known as continuous emission or Continuous Wave (CW). In use, continuous emission or CW devices typically impose a variation in the sensitivity of the device with distance in order to select a specific range at which the measurements are acquired, in order to provide the required discrimination of the distance from the RSD to the probe volume where the interaction with the fluid under investigation occurs. In other instances, RSDs emit a probe in the form of a series of pulses, for example a series of laser pulses or a series of sonic pulses. In use, the distance to the probe volume is determined by observing the time of flight (ToF) of the pulses from the moment of emission, through the moment at which the interaction occurs, to the moment of detection by the RSD.

In other embodiments, the emitted probe signal may comprise a non-continuous signal. For example, the emitted probe signal may comprise a series of pulses.

The remote sensing device may be configured to impose a variation in the sensitivity of the remote sensing device with distance in order to select a specific distance range for the emitted probe signal.

The remote sensing device may be configured to detect the modified probe signal emitted by the remote sensing device or another remote sensing device ("the return signal").

The system may comprise a control system.

The control system may be configured to adjust the position, for example the yaw angle, of the energy capture device.

The system may comprise a communication arrangement.

The communication arrangement may be of any suitable form and construction.

The communication arrangement may be configured to transmit the output value to the control system.

Alternatively, or additionally, the communication arrangement may be configured to transmit the output value to a remote location.

According to another aspect, there is provided a processing system configured to implement one or more of the previous aspects.

The processing system may comprise at least one processor. The processing system may comprise and/or be configured to access at least one data store or memory. The data store or memory may comprise or be configured to receive operating instructions or a program specifying operations of the at least one processor. The at least one processor may be configured to process and implement the operating instructions or program.

The at least one data store may comprise a reader, drive or other means configured to access, optical storage or disk such as a CD or DVD, flash drive, SD device, one or more memory chips such as DRAMs, a network attached drive (NAD), cloud storage, magnetic storage such as tape or magnetic disk or a hard-drive, and/or the like.

The processing system may comprise a network or interface module. The network or interface module may be connected or connectable to a network connection or data carrier, which may comprise a wired or wireless network connection or data carrier, such as a data cable, powerline data carrier, Wi-Fi, Bluetooth, Zigbee, internet connection or other similar connection. The network interface may comprise a router, modem, gateway and/or the like. The system or processing system may be configured to transmit or otherwise provide the audio signal via the network or interface module, for example over the internet, intranet, network or cloud.

The processing system may comprise a processing apparatus or a plurality of processing apparatus. Each processing apparatus may comprise at least a processor and optionally a memory or data store and/or a network or interface module. The plurality of processing apparatus may communicate via respective network or interface modules. The plurality of processing apparatus may form, comprise or be comprised in a distributed or server/client based processing system.

According to another aspect, there is provided a computer program product configured such that when processed by a suitable processing system configures the processing system to implement one or more of the previous aspects.

The computer program product may be provided on or comprised in a carrier medium. The carrier medium may be transient or non-transient. The carrier medium may be tangible or non-tangible. The carrier medium may comprise a signal such as an electromagnetic or electronic signal. The carrier medium may comprise a physical medium, such as a disk, a memory card, a memory, and/or the like.

According to another aspect, there is provided a carrier medium, the carrier medium comprising a signal, the signal when processed by a suitable processing system causes the processing system to implement one or more of the previous aspects.

It will be well understood by persons of ordinary skill in the art that whilst some embodiments may implement certain functionality by means of a computer program having computer-readable instructions that are executable to perform the method of the embodiments. The computer program functionality could be implemented in hardware (for example, by means of a CPU or by one or more ASICs (application specific integrated circuits)) or by a mix of hardware and software.

Whilst particular pieces of apparatus have been described herein, in alternative embodiments, functionality of one or more of those pieces of apparatus can be provided by a single unit, processing resource or other component, or functionality provided by a single unit can be provided by two or more units or other components in combination. For example, one or more functions of the processing system may be performed by a single processing device, such as a personal computer or the like, or one or more or each function may be performed in a distributed manner by a plurality of processing devices, which may be locally connected or remotely distributed.

It should be understood that any of the features defined above or which are described below in relation to any specific embodiment may be utilized, either alone or in combination with any other defined feature.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
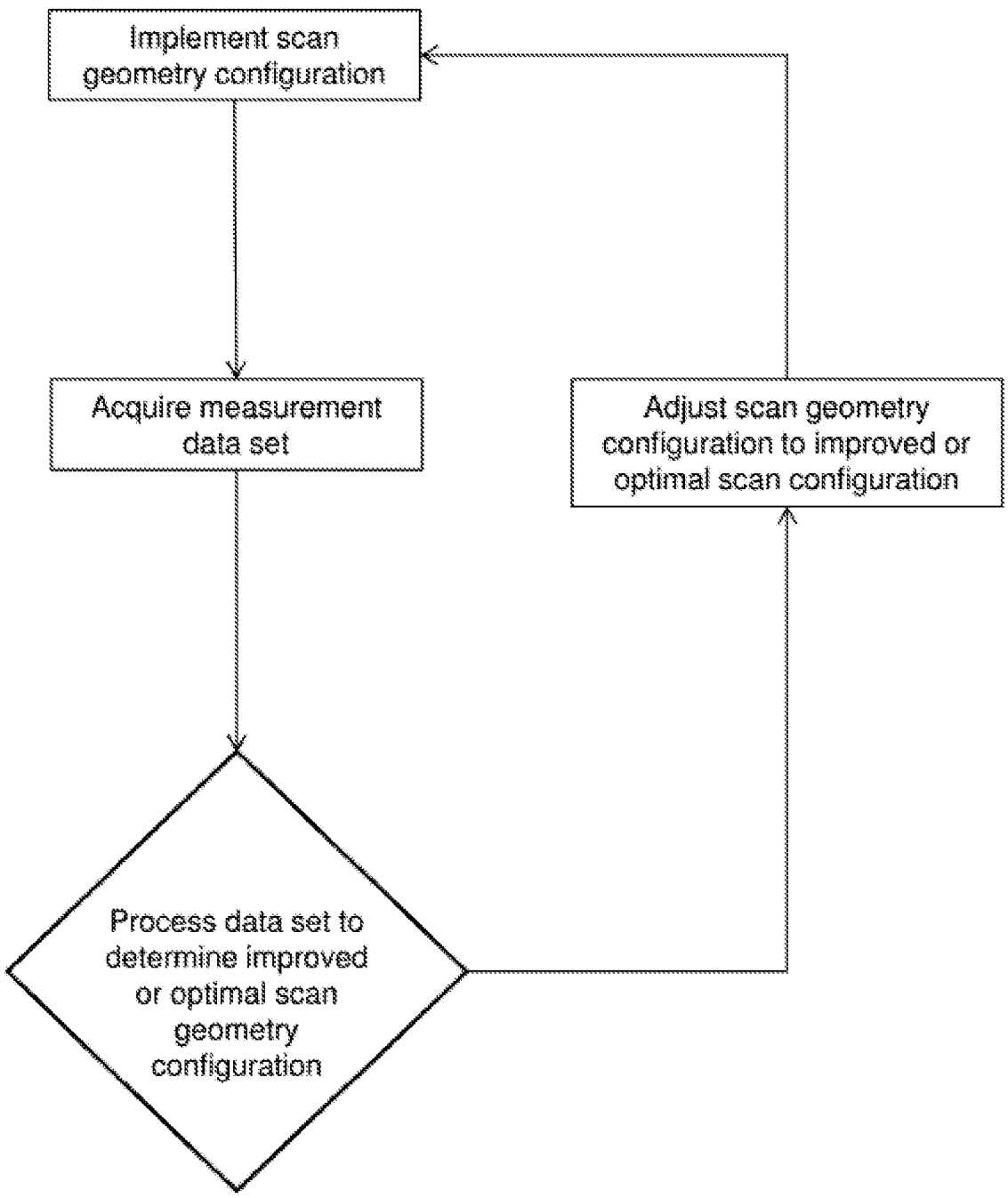
FIG. 1 shows a flow chart representing a method according to an embodiment of the present invention.

Referring first to FIG. 1 of the accompanying drawings, there is shown a flow chart representing a method according to an embodiment of the present invention.

As shown in FIG. 1, the first step of the method comprises implementing a first scan geometry configuration to acquire a first measurement data set. This first measurement data set is then processed to determine an improved or optimal scan geometry configuration. The measurement configuration of the remote sensing device is then adapted by changing the scan geometry configuration of the remote sensing device. This information is then fed back and the remote sensing device operated in the changed scan geometry configuration.

Beneficially, embodiments of the invention permit an optimal or at least improved remote sensing measurement campaign to be implemented under changing conditions by actively adjusting the measurement configuration of the remote sensing device during the measurement campaign. This is effected by adapting the scan geometry configuration of the remote sensing device during the measurement campaign based on measurement data acquired earlier during the same measurement campaign; in contrast to conventional RSDs which offer only a single scan geometry configuration during a measurement campaign—typically the default setting of the particular remote sensing device or one which is based on the initial objectives of the measurement campaign and projections of prevailing conditions made prior to commencing the measurement campaign. Embodiments of the present invention may adapt the configuration of the remote sensing device, and in particular the configuration of its scan geometry, during the measurement campaign to match the circumstances and conditions in which the measurements are acquired, which may vary significantly and repeatedly over time. Embodiments of the present invention thereby mitigate or eliminate inaccuracies which may otherwise arise in conventional systems and techniques due to measurement biases resulting from the, often significant, periods of time when measurements obtained are not fit for purpose or are relevant only for part of a given measurement campaign.

Figure 2:
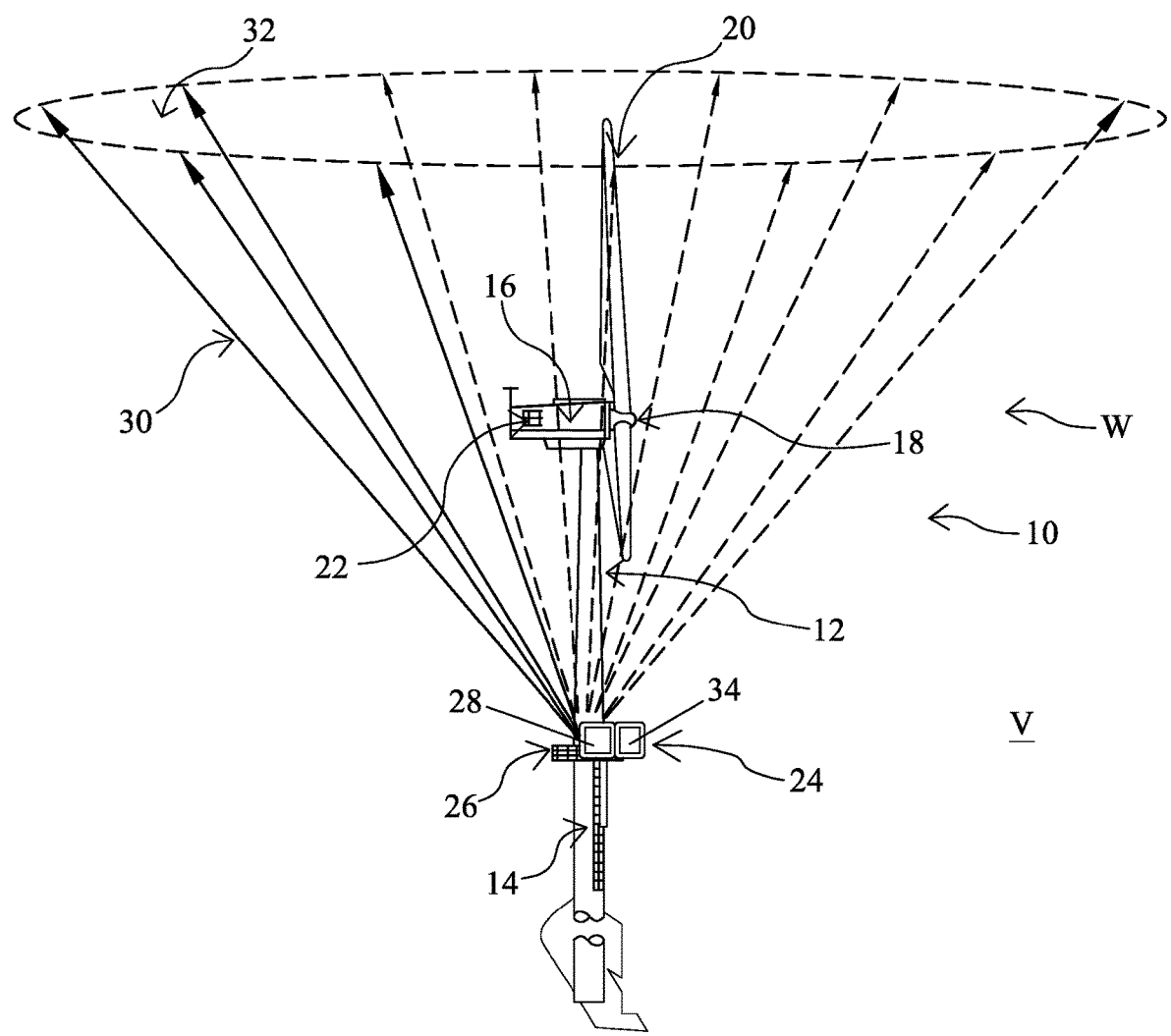
FIG. 2 shows a remote sensing system for implementing a method according to the present invention.

Referring now to FIG. 2 of the accompanying drawings, there is shown a system 10 for implementing the method shown in FIG. 1.

As shown in FIG. 2, in the illustrated embodiment the system 10 comprises a wind turbine system including a wind turbine 12 having a tower 14, a nacelle 16, and a hub 18 having a plurality of radially extending blades 20. The hub 18 is operatively coupled to an electrical generator 22 via a drive shaft (not shown). In use, the kinetic energy of wind W impinging on the blades 20 drives rotation of the hub 18 relative to the nacelle 16, this kinetic energy being transmitted to the electrical generator 22 where it is converted into electricity.

The system 10 further comprises a remote sensing device 24 which, in the illustrated embodiment, is disposed on a platform 26 provided around the tower 14 of the wind turbine 12. It will be recognized, however, that the remote sensing device 24 may be provided at other suitable locations, such as a remote location, on the nacelle 16, on the ground or on one or more other turbine (not shown).

Figure 3:
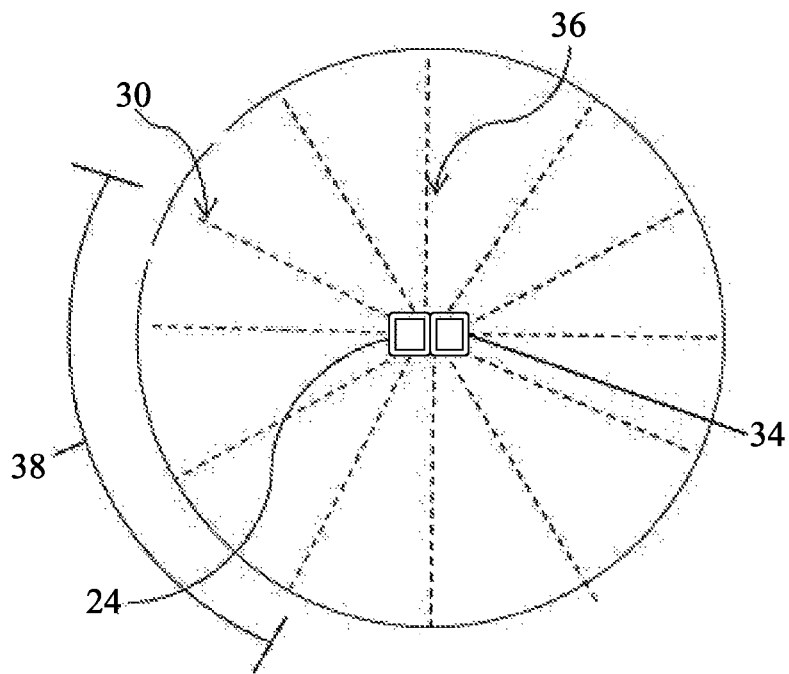
FIG. 3 shows a plan view of the remote sensing system shown in FIG. 2, in a first scan geometry configuration.
Figure 4:
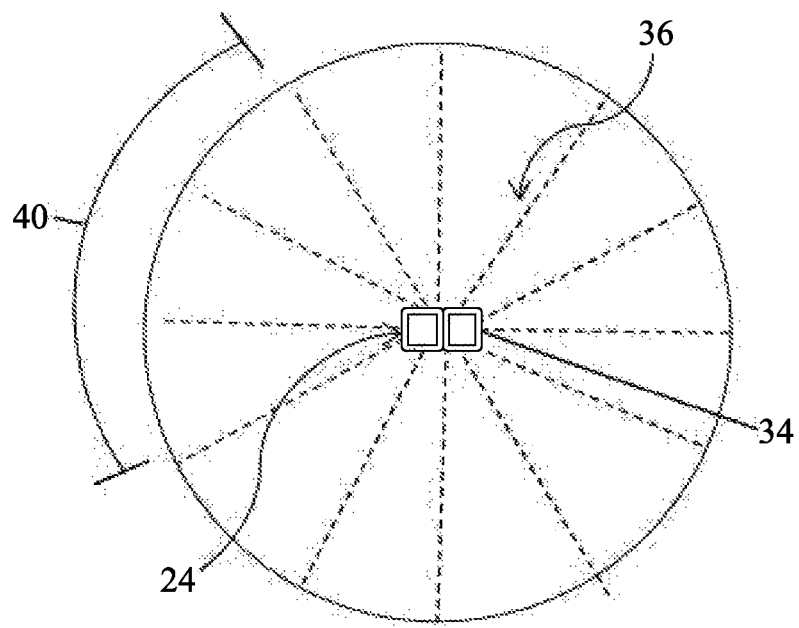
FIG. 4 shows a plan view of the remote sensing system shown in FIG. 1, in a second scan geometry configuration.

The remote sensing device 24 comprises a Lidar device having an optical source 28—in the illustrated embodiment a laser source—for transmitting a probe 30 in the form of a light beam to a region of interest 32 within the overall measurement volume V. The remote sensing device 24 further comprises or is operatively associated with a receiver 34—in the illustrated embodiment an optical antenna—for detecting the reflected probe 30. Referring now also to FIGS. 3 and 4 of the accompanying drawings, the remote sensing device 24 is capable of emitting the probe 30 along a number of different lines of sight, the available lines of sight capable of being emitted by remote sensing device 24 represented in FIG. 3 by dashed lines 36. As shown in FIG.

3, the remote sensing device 24 is initially configured and operated in a first scan geometry configuration to acquire a first measurement data set, the first scan geometry configuration comprising a first subset 38 of the lines of sight 36.

Following acquisition of the first data set, an improved or optimal second scan geometry configuration is determined from the acquired first data set. The determination of the optimal scan geometry configuration may depend on the specific objectives of the measurement campaign. For example, upwind data may be required, and the scan geometry adjusted to always point upwind as the wind direction changes from one period of data acquisition to the next. The direction to the target volume may change as the platform rotates, for example, a wind turbine nacelle, in which case the scan geometry is adjusted to direct the lines of sight as required. In the illustrated embodiment, the second scan geometry configuration is formed by a second subset 40 of the possible lines of sight 36. The remote sensing device 24 is then reconfigured from the first scan geometry configuration as shown in FIG. 2 to the second scan geometry configuration shown in FIG. 4. The new scan geometry is selected from a look up table in accordance with the prevailing conditions as measured, or the values of azimuth angle and elevation angle could be calculated and a configuration file written as required.

The remote sensing device 24 is then operated in the second scan geometry configuration to acquire a second data set relating to the region of interest 30. In this embodiment, the determination of the optimum or improved scan geometry configuration of the remote sensing device 24 is carried out during the measurement campaign and more particularly between each data acquisition. However, it will be recognized that the determination of the optimum or improved scan geometry configuration may alternatively be carried out during the measurement campaign but only after a selected number of data acquisitions or where the level of adjustment determined exceeds a selected threshold.

Figure 5:
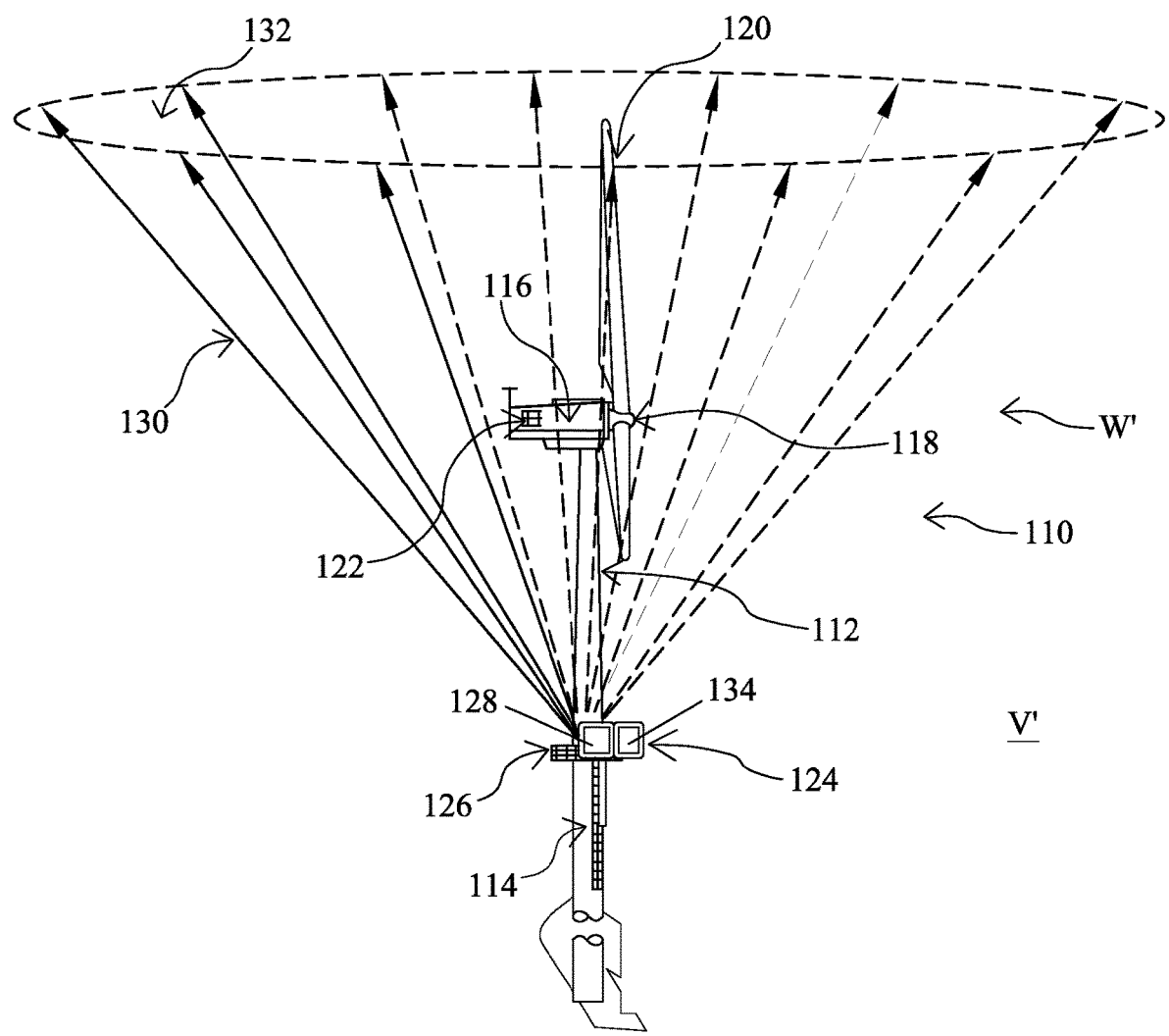
FIG. 5 shows another remote sensing system for implementing a method according to the present invention.

Referring now to FIG. 5 of the accompanying drawings, there is shown another system 110 for implementing the method shown in FIG. 1.

As shown in FIG. 5, in the illustrated embodiment the system 110 comprises a wind turbine system including a wind turbine 112 having a tower 114, a nacelle 116 and a hub 118 having a plurality of radially extending blades 120. The hub 118 is operatively coupled to an electrical generator 122 via a drive shaft (not shown). In use, the kinetic energy of wind W' impinging on the blades 120 drives rotation of the hub 118 relative to the nacelle 116, this kinetic energy being transmitted to the electrical generator 122 where it is converted into electricity.

The system 110 further comprises a remote sensing device 124 which, in the illustrated embodiment, is disposed on a platform 126 provided around the tower 114 of the wind turbine 112. It will be recognized, however, that the remote sensing device 124 may be provided at other suitable locations, such as a remote location, on the nacelle 116, on the ground or on one or more other turbine (not shown).

In this embodiment, the remote sensing device 124 comprises a Sodar device having an acoustic source 128 for transmitting a probe 130 in the form of a beam to a region of interest 132 within the overall measurement volume V'. The remote sensing device 124 further comprises or is operatively associated with a receiver 134—in the illustrated embodiment an acoustic antenna—for detecting the reflected probe 130.

Operation of the system 110 is similar to that of the system 10 and will be described with reference to FIGS. 6 and 7 of the accompanying drawings.

Figure 6:
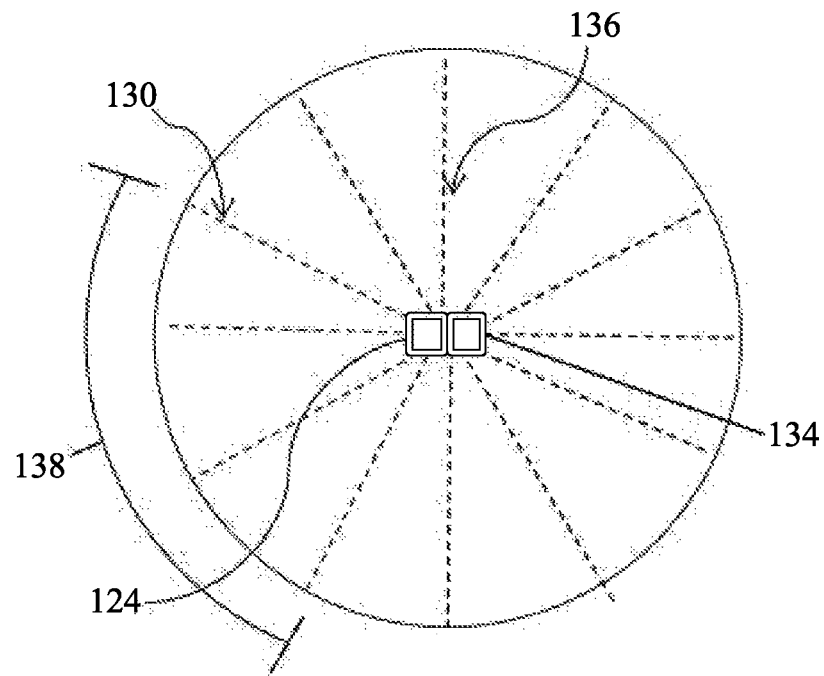
FIG. 6 shows a plan view of the remote sensing system shown in FIG. 5, in a first scan geometry configuration.
Figure 7:
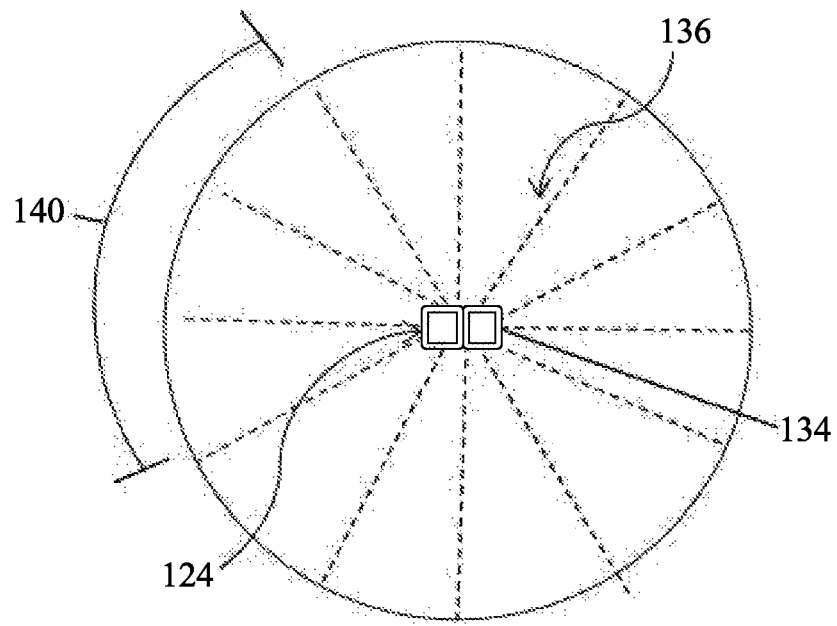
FIG. 7 shows a plan view of the remote sensing system shown in FIG. 5, in a second scan geometry configuration.

As shown in FIGS. 6 and 7, the remote sensing device 124 is capable of emitting the probe 130 along a number of different lines of sight, the available lines of sight capable of being emitted by remote sensing device 124 represented in FIG. 6 by dashed lines 136. As shown in FIG. 6, the remote sensing device 124 is initially configured and operated in a first scan geometry configuration to acquire a first measurement data set, the first scan geometry configuration comprising a first subset 138 of the lines of sight 136. Following acquisition of the first data set, an improved or optimal second scan geometry configuration is determined from the acquired first data set. The determination of the optimal scan geometry configuration may depend on the specific objectives of the measurement campaign. For example, upwind data may be required, and the scan geometry adjusted to always point upwind as the wind direction changes from one period of data acquisition to the next. The direction to the target volume may change as the platform rotates, for example, a wind turbine nacelle, in which case the scan geometry is adjusted to direct the lines of sight as required. In the illustrated embodiment, the second scan geometry configuration is formed by a second subset 140 of the possible lines of sight 136. The remote sensing device 124 is then reconfigured from the first scan geometry configuration as shown in FIG. 6 to the second scan geometry configuration shown in FIG. 7. The new scan geometry is selected from a look up table in accordance with the prevailing conditions as measured, or the values of azimuth and elevation angles could be calculated and a configuration file written as required. The remote sensing device 124 is then operated in the second scan geometry configuration to acquire a second data set relating to the region of interest 130. As in the system 10, in the system 110 the determination of the optimum or improved scan geometry configuration of the remote sensing device 124 is carried out during the measurement campaign and more particularly between each data acquisition. However, it will be recognized that the determination of the optimum or improved scan geometry configuration may alternatively be carried out during the measurement campaign but only after a selected number of data acquisitions or where the level of adjustment determined exceeds a selected threshold.

Figure 8:
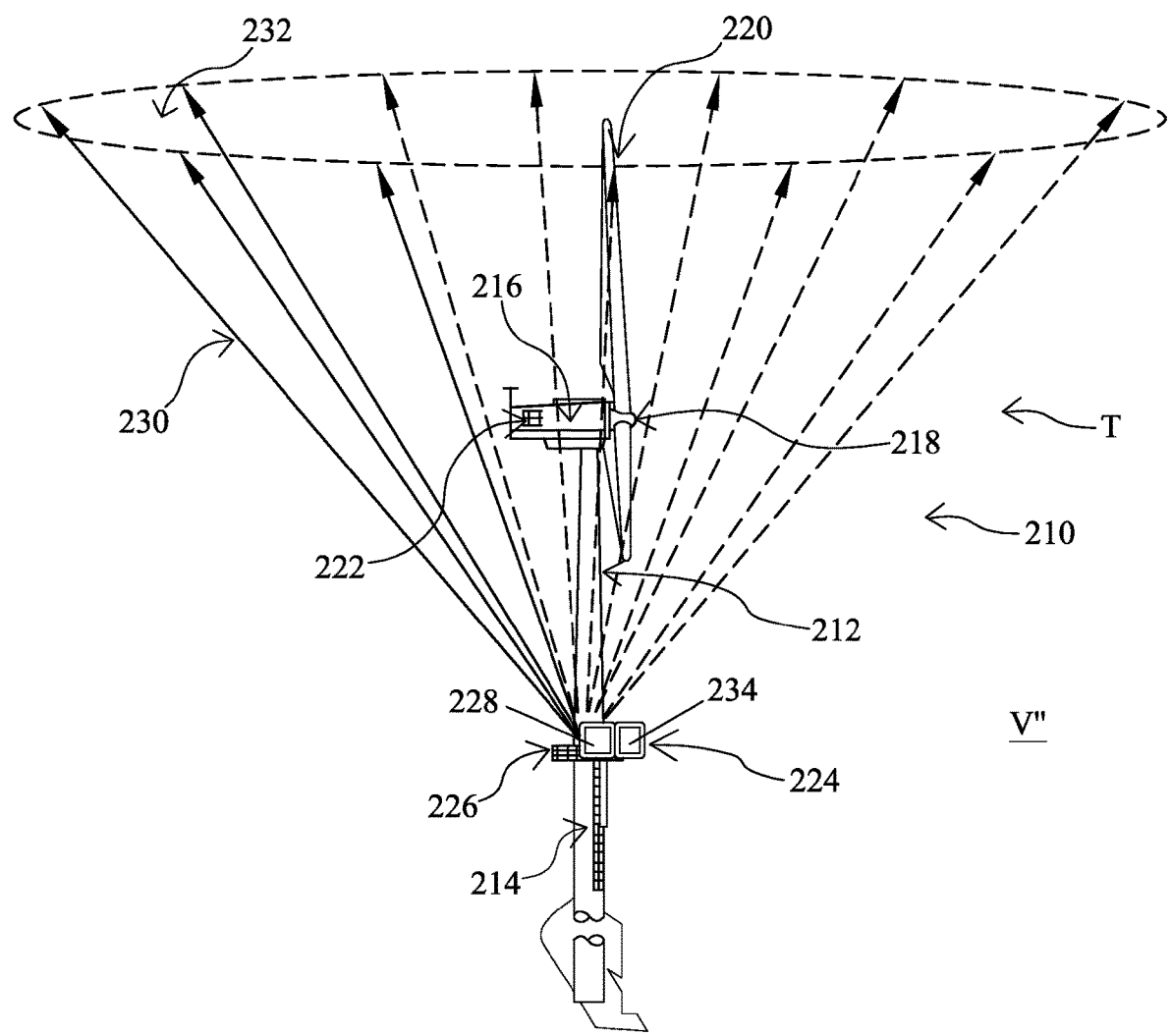
FIG. 8 shows another remote sensing system for implementing a method according to the present invention.

Referring now to FIG. 8 of the accompanying drawings, there is shown another system 210 for implementing the method shown in FIG. 1.

As shown in FIG. 8, in the illustrated embodiment the system 210 comprises a tidal turbine system including a turbine 212 having a tower 214, a nacelle 216 and a hub 218 having a plurality of radially extending blades 220. The hub 218 is operatively coupled to an electrical generator 222 via a drive shaft (not shown). In use, the kinetic energy of fluid flow T, such as the tide or current, impinging on the blades 220 drives rotation of the hub 218 relative to the nacelle 216, this kinetic energy being transmitted to the electrical generator 222 where it is converted into electricity.

The system 210 further comprises a remote sensing device 224 which, in the illustrated embodiment, is disposed on a platform 226 provided around the tower 214 of the turbine 212. It will be recognized, however, that the remote sensing device 224 may be provided at other suitable locations, such as a remote location, on the nacelle 216, on the seabed, a platform or on one or more other turbine (not shown).

In this embodiment, the remote sensing device 224 comprises an ADCP device having an acoustic source 228 for transmitting an acoustic probe 230 to a region of interest 232 within the overall measurement volume V'''. The remote sensing device 224 further comprises or is operatively associated with a receiver 234—in the illustrated embodiment an acoustic antenna—for detecting the reflected probe 230.

Operation of the system 210 is similar to that of the systems 10, 110 and will be described with reference to FIGS. 9 and 10 of the accompanying drawings.

Figure 9:
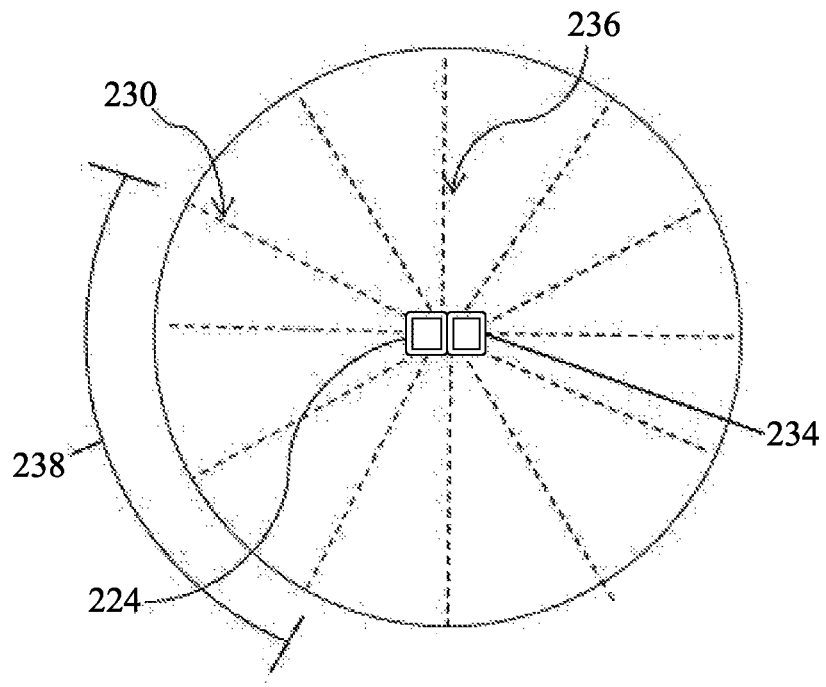
FIG. 9 shows a plan view of the remote sensing system shown in FIG. 8, in a first scan geometry configuration.
Figure 10:
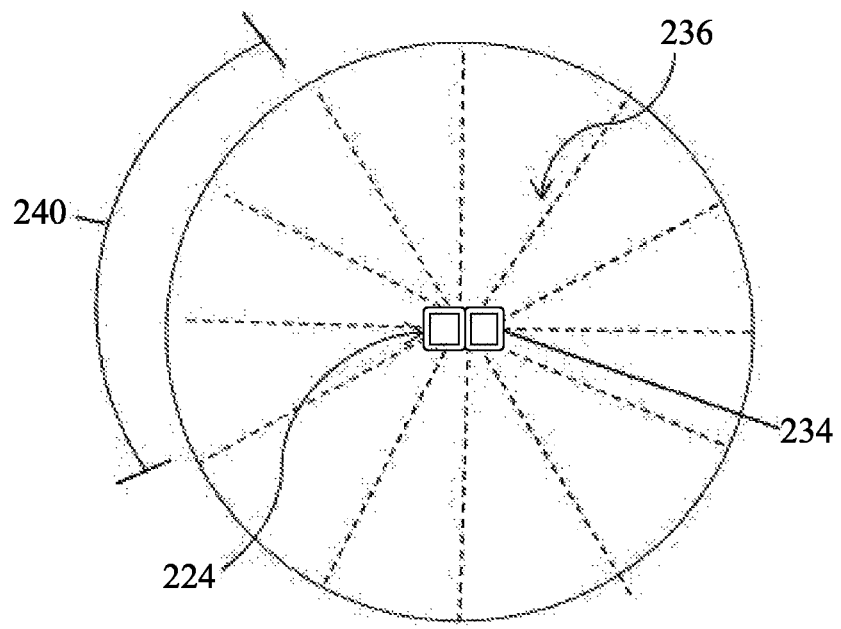
FIG. 10 shows a plan view of the remote sensing system shown in FIG. 8, in a second scan geometry configuration.

As shown in FIGS. 9 and 10, the remote sensing device 224 is capable of emitting the probe 230 along a number of different lines of sight, the available lines of sight capable of being emitted by remote sensing device 224 represented in FIG. 9 by dashed lines 236. As shown in FIG. 9, the remote sensing device 224 is initially configured and operated in a first scan geometry configuration to acquire a first measurement data set, the first scan geometry configuration comprising a first subset 238 of the lines of sight 236. Following acquisition of the first data set, an improved or optimal second scan geometry configuration is determined from the acquired first data set. The determination of the optimal scan geometry configuration may depend on the specific objectives of the measurement campaign. For example, upstream data may be required, and the scan geometry adjusted to always point upstream as the fluid direction changes from one period of data acquisition to the next. The direction to the target volume may change as the platform rotates, for example, a fluid turbine nacelle, in which case the scan geometry is adjusted to direct the lines of sight as required. In the illustrated embodiment, the second scan geometry configuration is formed by a second subset 240 of the possible lines of sight 236. The remote sensing device 224 is then reconfigured from the first scan geometry configuration as shown in FIG. 9 to the second scan geometry configuration shown in FIG. 10. The new scan geometry is selected from a look up table in accordance with the prevailing conditions as measured, or the values of azimuth and elevation angles could be calculated and a configuration file written as required. The remote sensing device 224 is then operated in the second scan geometry configuration to acquire a second data set relating to the region of interest 230. As in the systems 10, 110, in the system 210 the determination of the optimum or improved scan geometry configuration of the remote sensing device 224 is carried out during the measurement campaign and more particularly between each data acquisition. However, it will be recognized that the determination of the optimum or improved scan geometry configuration may alternatively be carried out during the measurement campaign but only after a selected number of data acquisitions or where the level of adjustment determined exceeds a selected threshold.

Figure 11:
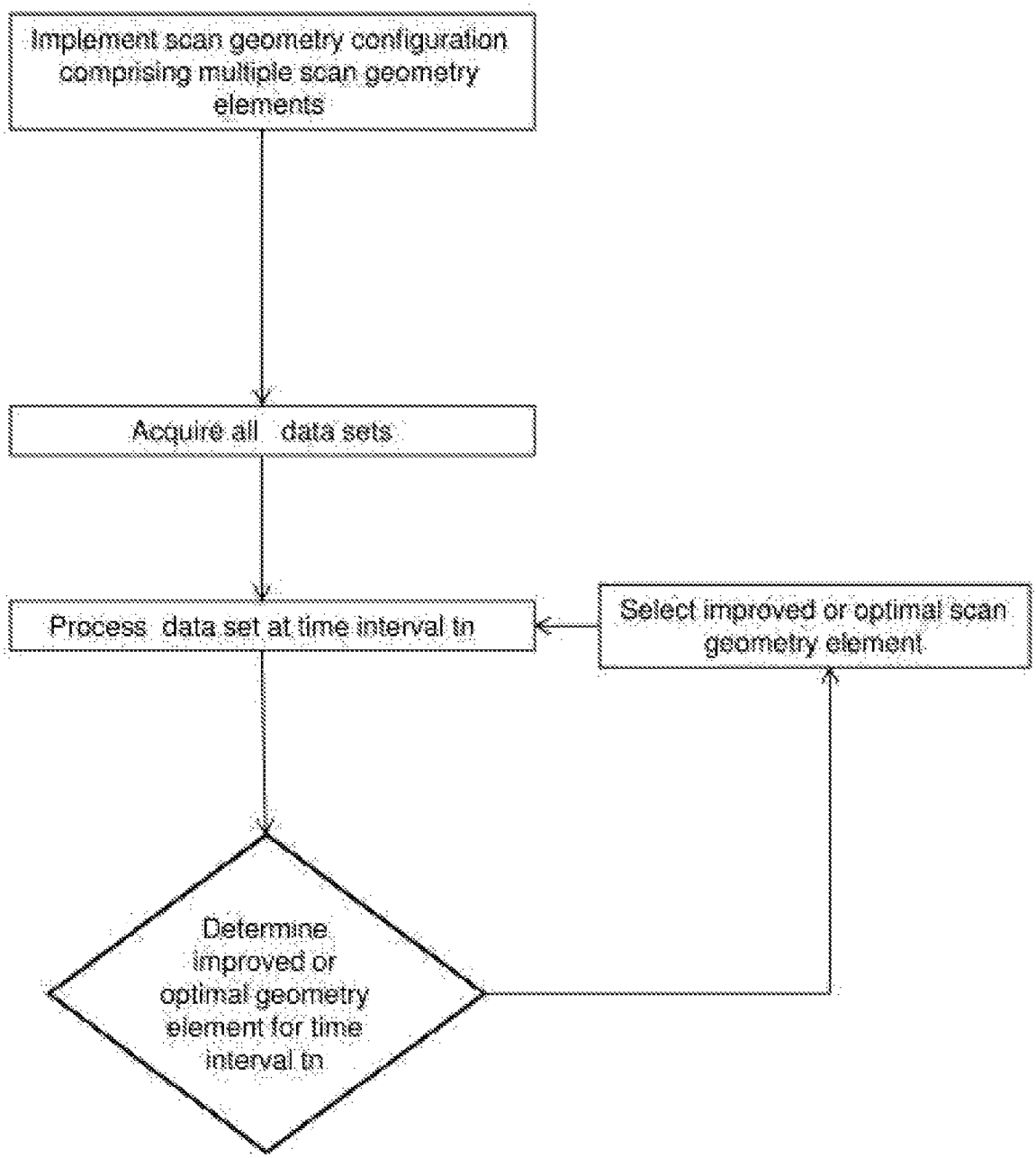
FIG. 11 shows a flow chart representing a method according to another embodiment of the present invention.

Referring now to FIG. 11 of the accompanying drawings, there is shown a flow chart representing a method according to another embodiment of the present invention.

As shown in FIG. 11, the first step of the method comprises implementing a scan geometry configuration comprising multiple scan geometry elements. The method then comprises determining, from the received measurement data, one of the plurality of scan geometries which is indicative of an improved or optimal scan geometry at a first time interval. An output indicative of the improved or optimal scan geometry at the first time interval is then provided. The process is repeated for each time interval.

Beneficially, this embodiment permits an optimal or at least improved remote sensing measurement campaign to be implemented under changing conditions by passively adjusting the scan geometry configuration of the remote sensing device during the measurement campaign by selecting the optimal scan geometry from the plurality of scan geometries available of which the first scan geometry is comprised, during processing of data acquired over multiple time steps; in contrast to conventional RSDs which offer only a single scan geometry configuration—typically the default setting of the particular remote sensing device—or one geometry configuration which is configured prior to commencing a measurement campaign and which is based on the initial objectives of the measurement campaign, such that an optimal scan geometry cannot be selected with reference to variation of wind conditions during the measurement campaign.

Figure 12:
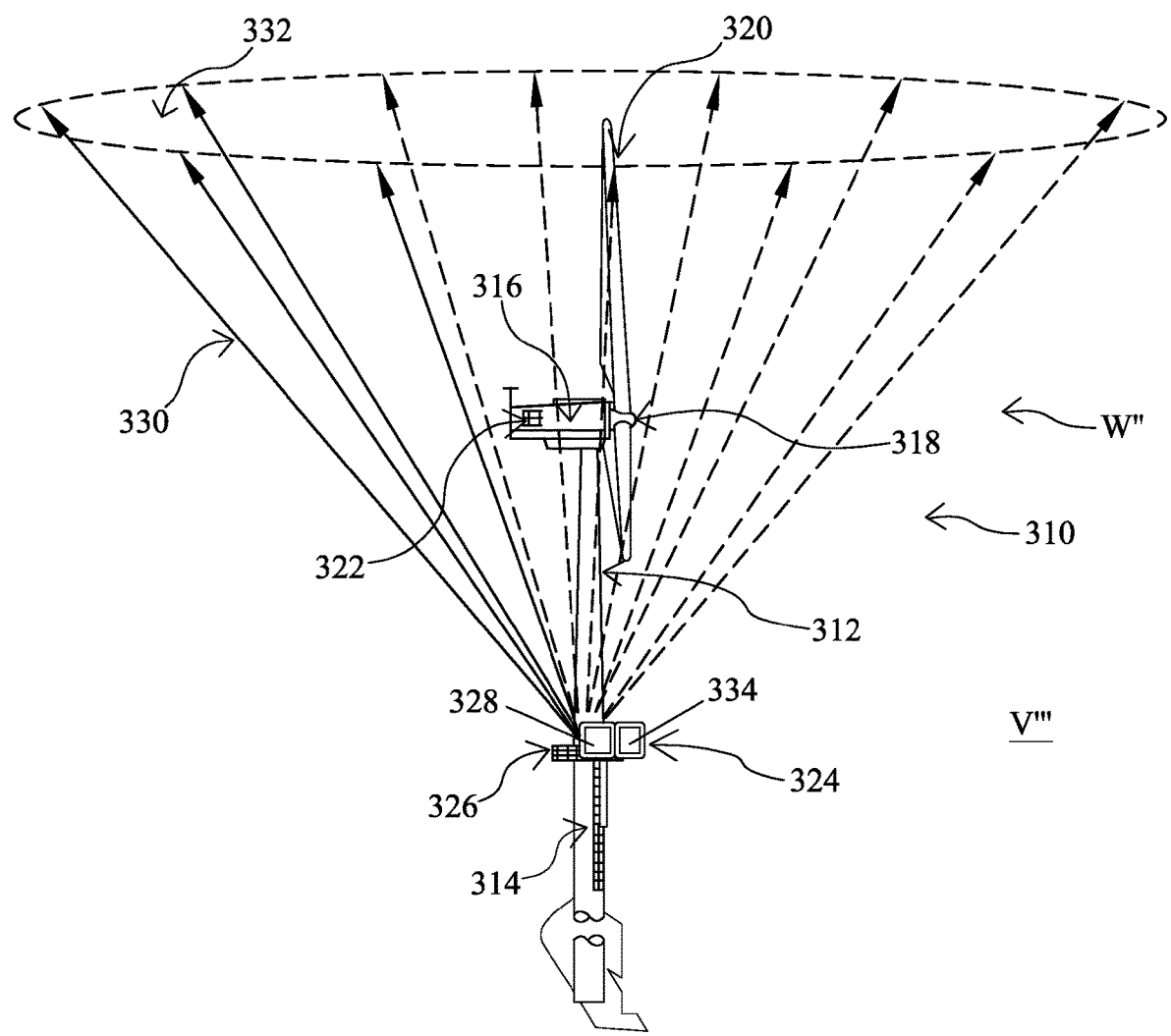
FIG. 12 shows a remote sensing system for implementing the method of FIG. 11.

FIG. 12 of the accompanying drawings shows a system 310 for implementing a method according to FIG. 11.

The system 310 comprises a wind turbine system including a wind turbine 312 having a tower 314, a nacelle 316 and a hub 318 having a plurality of radially extending blades 320. The hub 318 is operatively coupled to an electrical generator 322 via a drive shaft (not shown). In use, the kinetic energy of wind W''' impinging on the blades 320 drives rotation of the hub 318 relative to the nacelle 316, this kinetic energy being transmitted to the electrical generator 322 where it is converted into electricity.

The system 310 comprises a remote sensing device 324 which, in the illustrated embodiment, is disposed on a platform 326 provided around the tower 314 of the wind turbine 312. It will be recognized, however, that the remote sensing device 324 may be provided at other suitable locations, such as a remote location, on the nacelle 16, on the ground or on one or more other turbine (not shown).

The remote sensing device 324 comprises a Lidar device having an optical source 326—in the illustrated embodiment a laser source—for transmitting a probe 330 in the form of a light beam over a region of interest 332 within the overall measurement volume V''''. The remote sensing device 324 further comprises or is operatively associated with a receiver 334—in the illustrated embodiment an optical antenna—for detecting the reflected probe 330.

Figure 13:
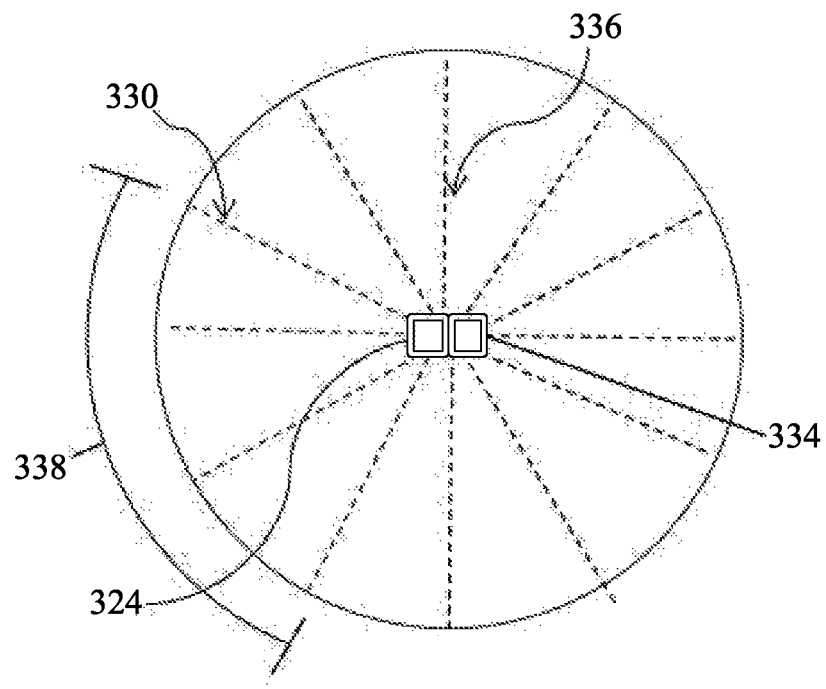
FIG. 13 shows a plan view of the remote sensing system shown in FIG. 12, in a first scan geometry configuration.
Figure 14:
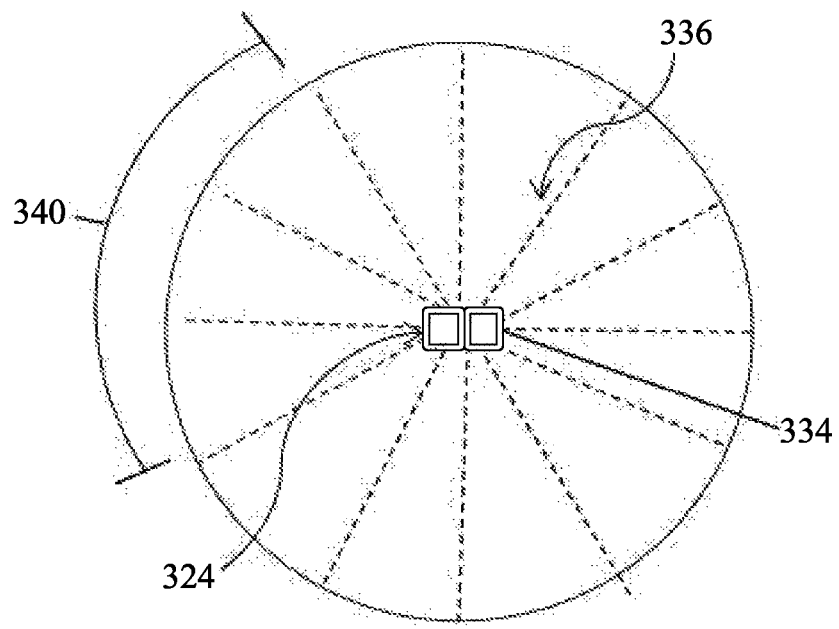
FIG. 14 shows a plan view of the remote sensing system shown in FIG. 12, in a second scan geometry configuration.

Referring now also to FIGS. 13 and 14 of the accompanying drawings, as in the case of system 10, in the system 310 the remote sensing device 324 is capable of emitting the probe 330 along a number of different lines of sight, the available lines of sight capable of being emitted by remote sensing device 324 represented in FIG. 13 by dashed lines 336. The remote sensing device 324 is configured and operated in a scan geometry configuration to acquire a first measurement data set at a first time interval t1, and second measurement data set at a second time interval t2, this repeated as often as required to obtain an nth data set at an nth time interval tn.

In this embodiment, the scan geometry configuration comprises a compound scan geometry encompassing a plurality of scan geometries and, in the illustrated embodiment, each of the 1st to nth data sets includes data for the entire region of interest 332. Following data acquisition, each data set is analysed. A first pass of each data set determines which one of the scan geometries from the plurality of scan geometries is indicative of an improved or optimal scan geometry at each of the given time intervals t1 . . . tn. In FIG. 13, the optimal or improved scan geometry configuration determined after data acquisition for time interval t1 is represented by subset 338 while the optimal or improved scan geometry configuration determined after data acquisition for time interval t2 is represented by subset 340. Once this is determined, a second pass of each data set determines one or more measurement of interest relating to the region of interest 332 at the given time interval t1, t2, . . . tn from the selected optimal subset of scan geometries.

In this embodiment, the determination of the optimum or improved scan geometry configuration of the remote sensing device 324 is carried out after data acquisition, rather than between each data acquisition as in the first embodiment.

Figure 15:
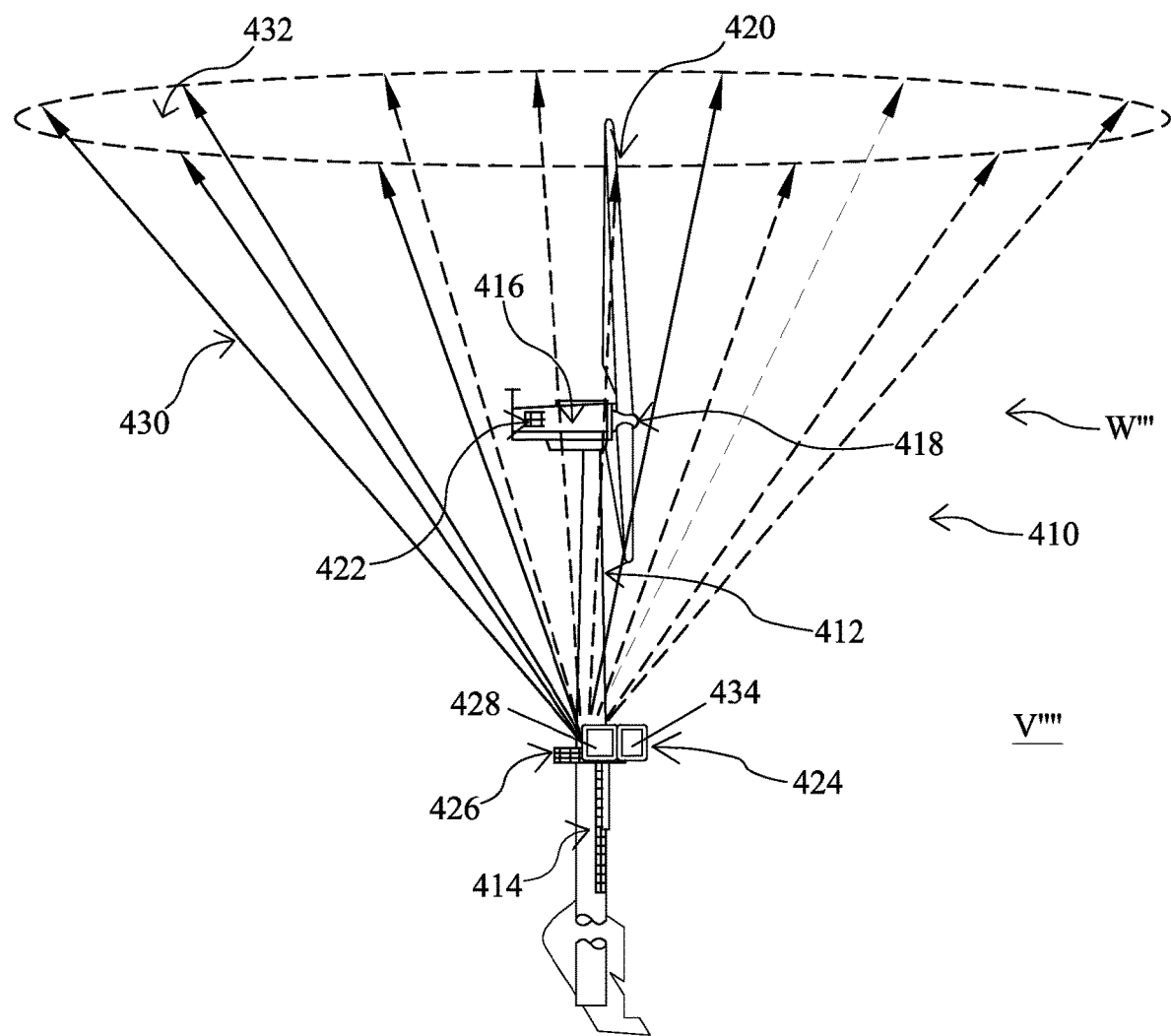
FIG. 15 shows another remote sensing system for implementing the method of FIG. 11.

FIG. 15 of the accompanying drawings shows another system 410 for implementing a method according to FIG. 11.

The system 410 comprises a wind turbine system including a wind turbine 412 having a tower 414, a nacelle 416 and a hub 418 having a plurality of radially extending blades 420. The hub 418 is operatively coupled to an electrical generator 422 via a drive shaft (not shown). In use, the kinetic energy of wind W'" impinging on the blades 420 drives rotation of the hub 418 relative to the nacelle 416, this kinetic energy being transmitted to the electrical generator 422 where it is converted into electricity.

The system 410 comprises a remote sensing device 424 which, in the illustrated embodiment, is disposed on a platform 426 provided around the tower 414 of the wind turbine 412. It will be recognized, however, that the remote sensing device 424 may be provided at other suitable locations, such as a remote location, on the nacelle 416, on the ground or on one or more other turbine (not shown).

In this embodiment, the remote sensing device 424 comprises a Sodar device having an acoustic source 426 for transmitting a probe 430 in the form of a beam over a region of interest 432 within the overall measurement volume V''''. The remote sensing device 424 further comprises or is operatively associated with a receiver 334—in the illustrated embodiment an acoustic antenna—for detecting the reflected probe 430.

Figure 16:
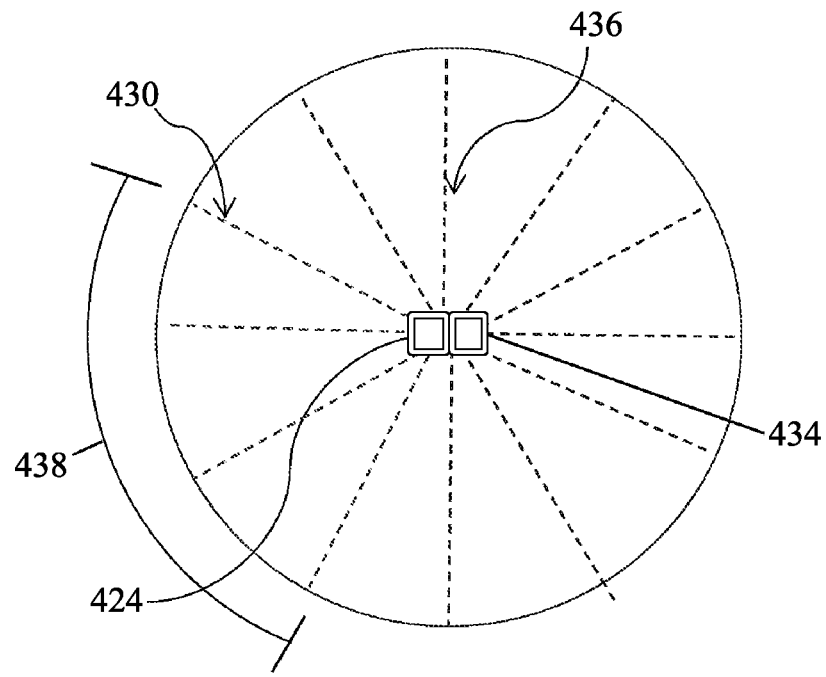
FIG. 16 shows a plan view of the remote sensing system shown in FIG. 15, in a first scan geometry configuration.
Figure 17:
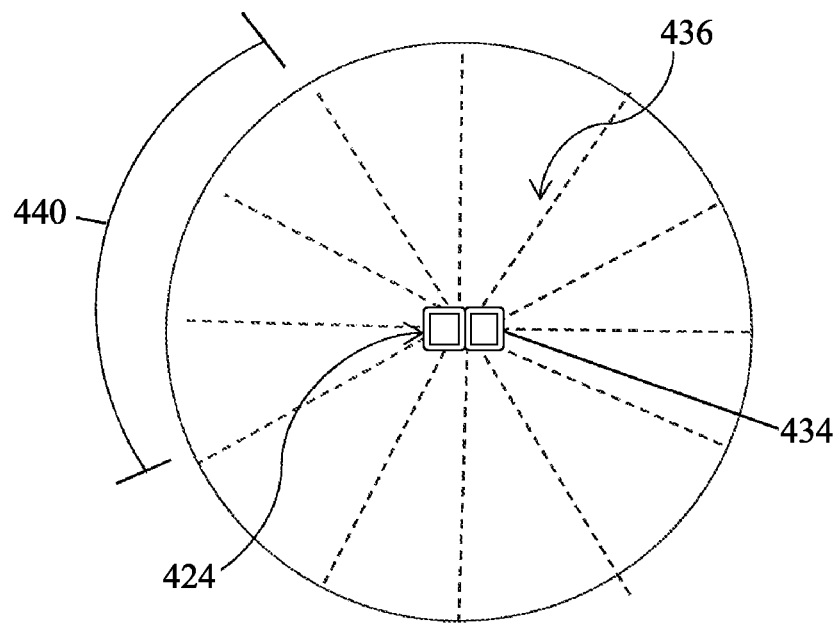
FIG. 17 shows a plan view of the remote sensing system shown in FIG. 15, in a second scan geometry configuration.

Referring now also to FIGS. 16 and 17 of the accompanying drawings, as in the case of system 310, in the system 410 the remote sensing device 424 is capable of emitting the probe 430 along a number of different lines of sight, the available lines of sight capable of being emitted by remote sensing device 424 represented in FIG. 16 by dashed lines 436. The remote sensing device 424 is configured and operated in a scan geometry configuration to acquire a first measurement data set at a first time interval t1, and second measurement data set at a second time interval t2, this repeated as often as required to obtain an nth data set at an nth time interval tn.

As in the previous embodiment, the scan geometry configuration comprises a compound scan geometry encompassing a plurality of scan geometries and, in the illustrated embodiment, each of the 1st to nth data sets includes data for the entire region of interest 432.

Following data acquisition, each data set is analysed. A first pass of each data set determines which one of the scan geometries from the plurality of scan geometries is indicative of an improved or optimal scan geometry at each of the given time intervals t1 . . . tn. In FIG. 16, the optimal or improved scan geometry configuration determined after data acquisition for time interval t1 is represented by subset 438 while the optimal or improved scan geometry configuration determined after data acquisition for time interval t2 is represented by subset 440. Once this is determined, a second pass of each data set determines one or more measurement of interest relating to the region of interest 432 at the given time interval t1, t2, . . . tn from the selected optimal subset of scan geometries. As in the previous embodiment, the determination of the optimum or improved scan geometry configuration of the remote sensing device 424 is carried out after data acquisition, rather than between each data acquisition.

Figure 18:
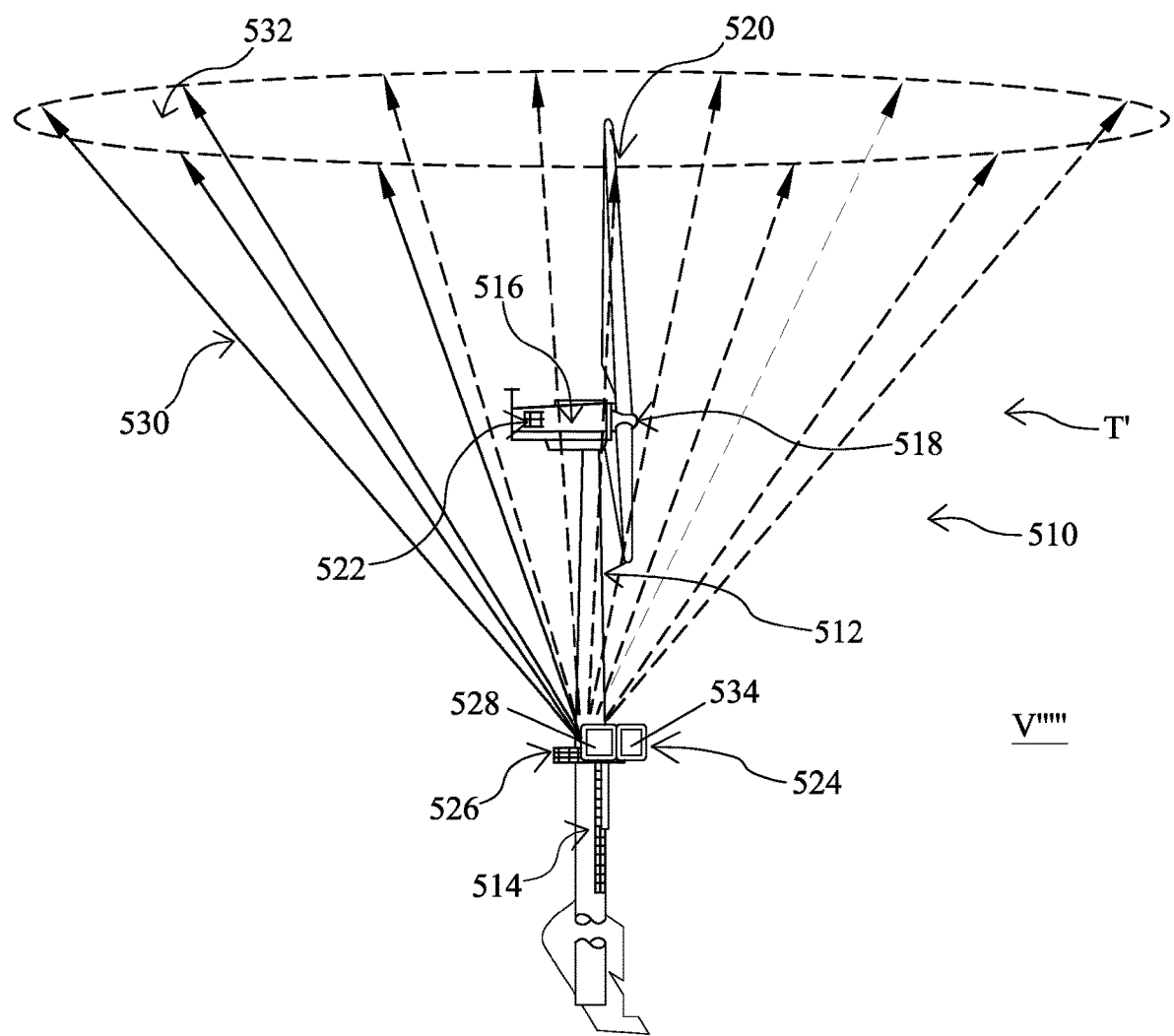
FIG. 18 shows another remote sensing system for implementing the method of FIG. 11.

Referring now to FIG. 18 of the accompanying drawings, there is shown another system 510 for implementing the method shown in FIG. 11.

As shown in FIG. 18, in the illustrated embodiment the system 510 comprises a tidal turbine system including a turbine 512 having a tower 514, a nacelle 516 and a hub 518 having a plurality of radially extending blades 520. The hub 518 is operatively coupled to an electrical generator 522 via a drive shaft (not shown). In use, the kinetic energy of fluid flow T', such as the tide or current, impinging on the blades 520 drives rotation of the hub 518 relative to the nacelle 516, this kinetic energy being transmitted to the electrical generator 522 where it is converted into electricity.

The system 510 further comprises a remote sensing device 524 which, in the illustrated embodiment, is disposed on a platform 526 provided around the tower 514 of the turbine 512. It will be recognized, however, that the remote sensing device 524 may be provided at other suitable locations, such as a remote location, on the nacelle 516, on the seabed, a platform or on one or more other turbine (not shown).

In this embodiment, the remote sensing device 524 comprises an ADCP device having an acoustic source 528 for transmitting a sonic probe 530 to a region of interest 532 within the overall measurement volume V''''". The remote sensing device 524 further comprises or is operatively associated with a receiver 534—in the illustrated embodiment an acoustic antenna—for detecting the reflected probe 530.

Figure 19:
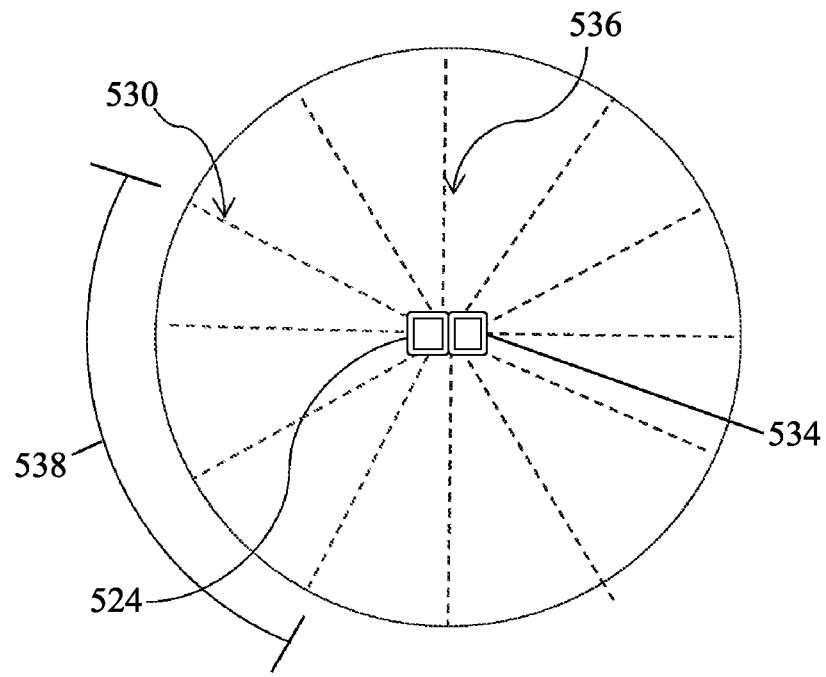
FIG. 19 shows a plan view of the remote sensing system shown in FIG. 18, in a first scan geometry configuration.
Figure 20:
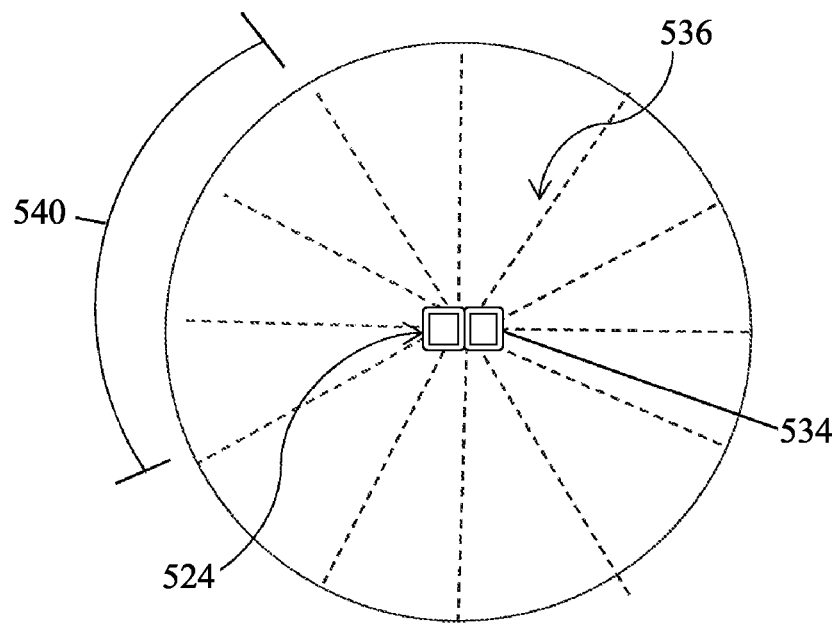
FIG. 20 shows a plan view of the remote sensing system shown in FIG. 18, in a second scan geometry configuration.
Figure 21:
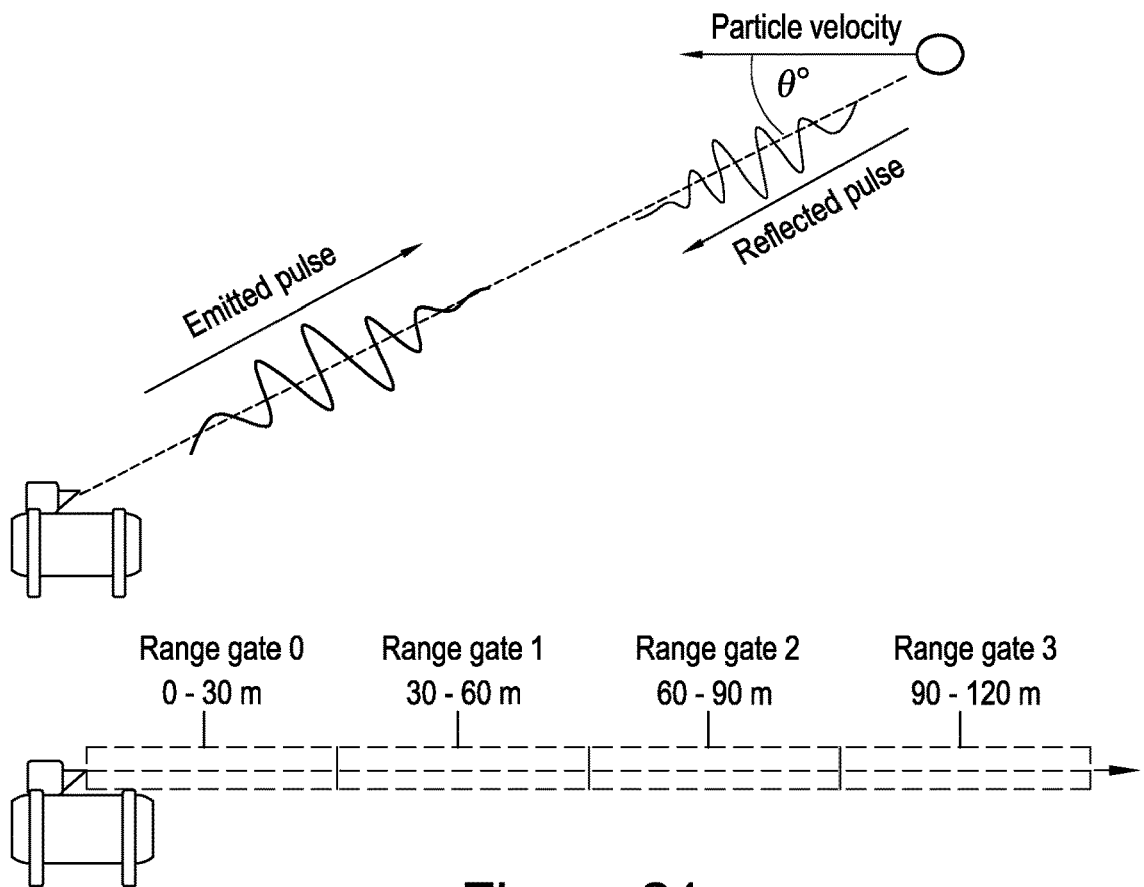
FIG. 21 shows a diagrammatic view of an exemplary remote sensing device for use in the method of FIG. 1, the system of FIGS. 2 to 4, the system of FIGS. 5 to 7, the system of FIGS. 8 to 10, the method of FIG. 11, the system of FIGS. 12 to 14, the system of FIGS. 15 to 17, or the system of FIGS. 18 to 20.
Figure 22:
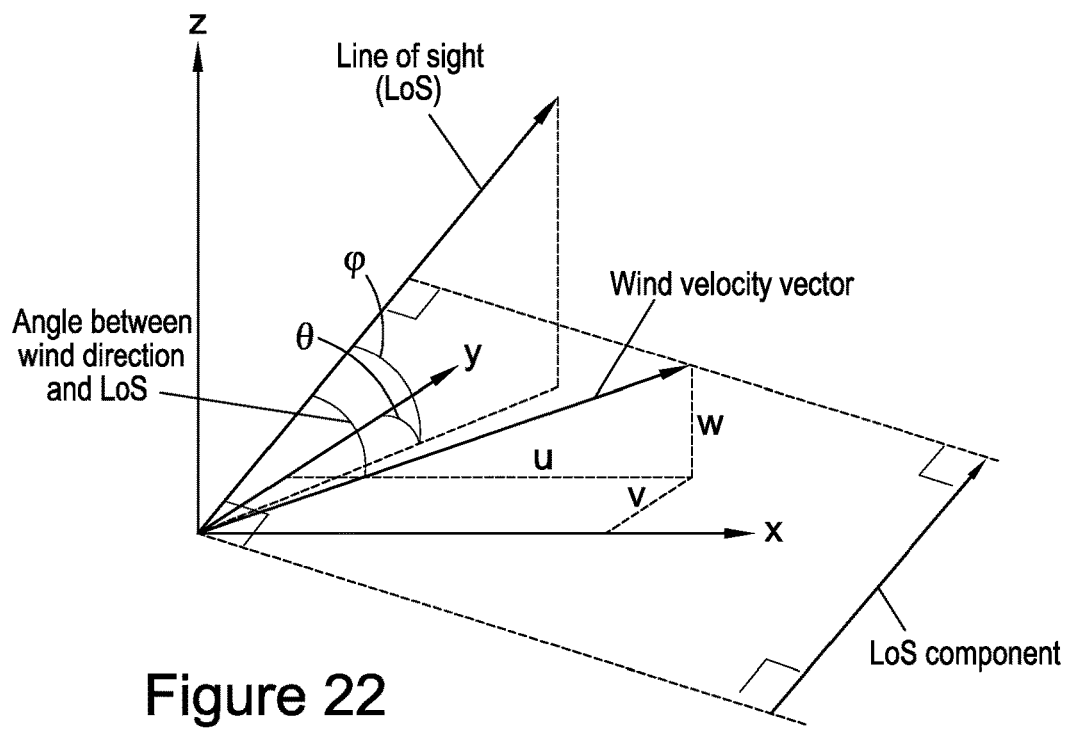
FIG. 22 shows a co-ordinate system illustrating the determination of fluid velocity.
Figure 23:
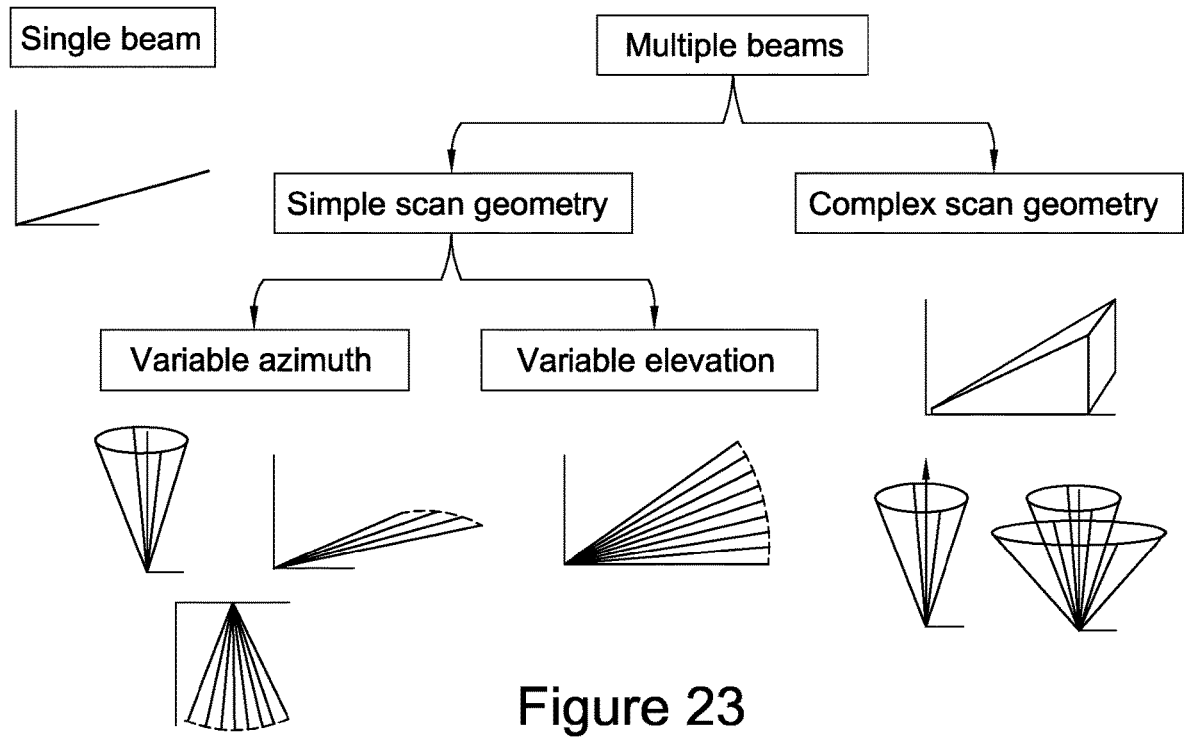
FIG. 23 shows examples of different scan geometries.
Figure 24:
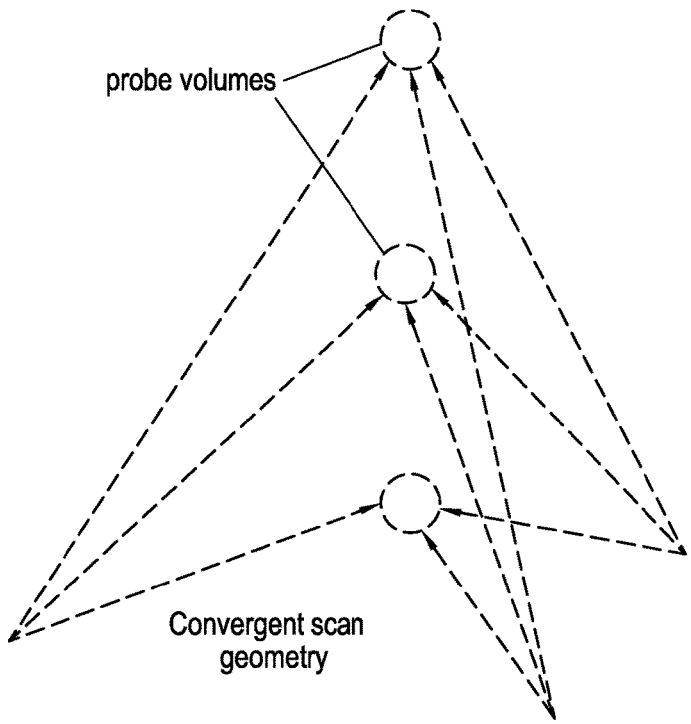
FIG. 24 shows a diagrammatic view illustrating a convergent scan geometry.

Referring now also to FIGS. 19 and 20 of the accompanying drawings, the remote sensing device 524 is capable of emitting the probe 530 along a number of different lines of sight, the available lines of sight capable of being emitted by remote sensing device 524 represented in FIG. 19 by dashed lines 536. The remote sensing device 524 is configured and operated in a scan geometry configuration to acquire a first measurement data set at a first time interval t1, and second measurement data set at a second time interval t2, this repeated as often as required to obtain an nth data set at an nth time interval tn.

As in the previous embodiment, the scan geometry configuration comprises a compound scan geometry encompassing a plurality of scan geometries and, in the illustrated embodiment, each of the 1st to nth data sets includes data for the entire region of interest 532.

Following data acquisition, each data set is analysed. A first pass of each data set determines which one of the scan geometries from the plurality of scan geometries is indicative of an improved or optimal scan geometry at each of the given time intervals t1 . . . tn. In FIG. 19, the optimal or improved scan geometry configuration determined after data acquisition for time interval t1 is represented by subset 538 while the optimal or improved scan geometry configuration determined after data acquisition for time interval t2 is represented by subset 540. Once this is determined, a second pass of each data set determines one or more measurement of interest relating to the region of interest 532 at the given time interval t1, t2, . . . tn from the selected optimal subset of scan geometries. As in the previous embodiment, the determination of the optimum or improved scan geometry configuration of the remote sensing device 524 is carried out after data acquisition, rather than between each data acquisition.

More details relating to the operation and analysis techniques employed in each of the above embodiments will now be described with reference to FIGS. 21 to 24.

As described above, the scan geometry configuration of the remote sensing devices is used to acquire the measurement data from which characteristics of the fluid under investigation can be determined and the scan geometry configuration may include, amongst other things, the locations and distribution of probe volumes within the measurement volume (defined in Cartesian co-ordinates x, y, z); the orientation of the probe volumes in terms of the directions along which the probe is emitted and detected (defined in terms of azimuth and elevation angles ($\theta$, $\phi$)); and the times at which the probes are emitted, interact with the fluid under investigation, and are subsequently detected (t).

With regard to the location of the probe volumes, in the illustrated embodiments the range is determined by measuring the back-scatter of light radiation which is reflected by natural aerosols carried by the wind, such as dust, water droplets, pollution, pollen, salt crystals or the like. The emissions are back-scattered and detected and the Doppler shift imposed on the frequency of the laser emissions by the motion of the aerosol particles is analysed to infer characteristics of the fluid motion. In addition, the strength of the detected signal can indicate the concentration of the aerosol particles at the point where the interaction occurred. Polarization effects are also sometimes observed. The detection of various effects of the interaction with the fluid allows investigation of various properties in addition to its motion, such as the fluid's composition. The Doppler shift is proportional to the component of the fluid velocity vector aligned with the line of sight (LoS) along which the laser emissions are directed, that is, the radial velocity. It will therefore depend on the angle between the LoS and the direction of the fluid velocity. The fluid velocity vector components can thus be inferred from observations of radial velocities along various lines of sight if the relationship between the wind velocity vectors witnessed in each probe volume can be deduced from the observations. For example, in the simplest case, the wind velocity vector can be inferred if each probe volume used in the calculation witnesses the same wind velocity vector. This is the case under conditions of uniform flow.

With regard to the orientation of the probe volume, where this is determined by the line of sight along which the probe is emitted and the radial distance r of the probe along this line of sight is known, then (r, $\theta$, $\phi$) can be stated and (x, y, z) omitted since the location and orientation is fully described in polar co-ordinates.

With regard to the timing information, this may be necessary to take account of the dimensions and characteristics of the probe volume itself. For example, the response of the probe may not be symmetrical within the probe volume and may give rise to effects which must be accommodated using the time information, such as unsteady features in fluid flow in time and/or where coherent fluid structures in space advected through the measurement volume are occurring and are being observed Timing information is also important if the measurements in each probe volume happen in a sequence rather than simultaneously, for example, as a result of the acquisition of measurements along a single line of sight or direction which is then scanned between a series of different orientations, rather than along multiple lines of sight which are implemented simultaneously.

It should be understood that the embodiment described herein is merely exemplary and that various modifications may be made thereto without departing from the scope of the invention.

For example, while the scan geometries in the illustrated embodiments comprises divergent scan geometries whereby multiple lines of sight under consideration may radiate and diverge from the location of a single RSD in order to fulfil the requirement for multiple angles relative to the fluid velocity direction, the scan geometries may take a number of different forms, as illustrated in FIG. 9 and may, for example, comprise a convergent scan geometry as illustrated in FIG. 10, using single lines of sight from multiple RSDs which converge on a location of interest from different directions. In the case of convergent beams, the relationship between the fluid velocity vector witnessed by each probe volume is simplified since the probe volumes are co-located and so witness the same velocity vector.

The invention claimed is:

1. A method for use in remote sensing applications associated with a wind energy capture device in the form of a wind turbine or a tidal energy capture device in the form of a tidal turbine, the method comprising:
   receiving measurement data acquired previously during a remote sensing measurement campaign;
   determining from the received measurement data an adjustment in a measurement;
   configuration of a remote sensing device, wherein said adjustment to the measurement configuration of the remote sensing device comprises a change in a scan geometry configuration of the remote sensing device, and
   providing an output indicative of the change to the scan geometry configuration of the remote sensing device for use in actively adjusting said measurement configuration of the remote sensing device during said measurement campaign,
   wherein determining said change in the scan geometry configuration comprises determining a measurement of interest from said received measurement data and determining from said measurement of interest a scan geometry configuration which is indicative of an optimal scan geometry configuration of the remote sensing device for said measurement of interest,
   wherein the output is based on the scan geometry configuration which is indicative of the optimal scan geometry configuration of the remote sensing device for said measurement of interest, and
   wherein adjusting the measurement configuration of the remote sensing device during said measurement campaign comprises rewriting the scan geometry configuration of the remote sensing device and/or selecting a scan geometry configuration for the remote sensing device from a plurality of pre-determined scan geometry configurations for the remote sensing device based on the output.

2. The method of claim 1, further comprising adjusting the measurement configuration of the remote sensing device by changing, during said measurement campaign, the scan geometry configuration of the remote sensing device based on the output.

3. The method of claim 1, wherein at least one of:
   the measurement data acquired previously during the remote sensing measurement campaign comprises measurement data acquired by the remote sensing device in a previous scan geometry configuration of the remote sensing device during said measurement campaign; and the measurement data acquired previously during the remote sensing measurement campaign comprises measurement data acquired by another remote sensing device or other sensing or measurement device during said measurement campaign.

4. The method of claim 1, further comprising outputting the measurement of interest.

5. The method of claim 1, further comprising a direction tracking operation.

6. The method of claim 1, further comprising a volume tracking operation.

7. The method of claim 1, further comprising a convergent scan geometry operation.

8. The method of claim 1, wherein the scan geometry configuration comprises scan geometry information comprising at least one of:
timing information;
information relating to a time at which a probe is emitted;
information relating to a time the probe interacts with a fluid under investigation; and
information relating to a time the probe is detected.

9. The method of claim 1, wherein the scan geometry configuration of the remote sensing device comprises a simple scan geometry element or arrangement.

10. The method of claim 1, wherein the scan geometry configuration of the remote sensing device comprises a complex scan geometry element or arrangement.

11. The method of claim 1, wherein the scan geometry configuration of the remote sensing device comprises a compound scan geometry element or arrangement.

12. The method of claim 1, wherein the measurement data comprises at least one of:
fluid velocity data;
fluid speed data;
fluid direction data;
fluid turbulence data; and
fluid compositional data.

13. A system for use in remote sensing applications associated with a wind energy capture device in the form of a wind turbine or a tidal energy capture device in the form of a tidal turbine, the system comprising:
a controller configured to receive measurement data acquired during a remote sensing device measurement campaign, the controller configured to determine from the received measurement data an adjustment in a measurement configuration of a remote sensing device, wherein said adjustment to the measurement configuration of the remote sensing device comprises a change in a scan geometry configuration of the remote sensing device,
wherein the controller is configured to provide an output indicative of the change to the scan geometry configuration of the remote sensing device for use in actively adjusting said measurement configuration of the remote sensing device during said measurement campaign,
wherein determining said change in the scan geometry configuration comprises determining a measurement of interest from said received measurement data and determining from said measurement of interest a scan geometry configuration indicative of an optimal scan geometry configuration of the remote sensing device for said measurement of interest,
wherein the output is based on the scan geometry configuration which is indicative of the optimal scan geometry configuration of the remote sensing device for said measurement of interest, and
wherein adjusting the measurement configuration of the remote sensing device during said measurement campaign comprises rewriting the scan geometry configuration of the remote sensing device and/or selecting a scan geometry configuration for the remote sensing device from a plurality of pre-determined scan geometry configurations for the remote sensing device based on the output.

14. The system of claim 13, further comprising a remote sensing device.

15. The system of claim 14, wherein the remote sensing device comprises a Lidar sensing device, a Sodar sensing arrangement, or an Acoustic Doppler Current Profiler (ADCP).

16. The system of claim 13, further comprising one or more energy capture devices.

17. The system of claim 13, further comprising a control system, wherein the control system may be configured to adjust a position of the energy capture device.

18. A processing system configured to implement the method of claim 1 or the system of claim 13.

19. A computer program product configured such that when processed by a suitable processing system configures the processing system to implement the method of claim 1 or the system of claim 13.

* * * * *